(12) United States Patent
Ajan

(10) Patent No.: US 7,736,769 B2
(45) Date of Patent: Jun. 15, 2010

(54) MAGNETIC RECORDING MEDIUM, METHOD OF PRODUCING THE SAME, AND MAGNETIC STORAGE APPARATUS

(75) Inventor: Antony Ajan, Kawasaki (JP)

(73) Assignee: Showa Denko K.K., Tokyo (JP)

( * ) Notice: Subject to any disclaimer, the term of this patent is extended or adjusted under 35 U.S.C. 154(b) by 1004 days.

(21) Appl. No.: 11/346,656

(22) Filed: Feb. 3, 2006

(65) Prior Publication Data
US 2006/0177702 A1    Aug. 10, 2006

Related U.S. Application Data

(63) Continuation-in-part of application No. 11/211,051, filed on Aug. 24, 2005, now abandoned.

(30) Foreign Application Priority Data

Feb. 4, 2005 (JP) ............................. 2005-029558
Nov. 25, 2005 (JP) ............................. 2005-340407

(51) Int. Cl.
G11B 5/66 (2006.01)
(52) U.S. Cl. .................................... 428/836
(58) Field of Classification Search ....................... None
See application file for complete search history.

(56) References Cited

U.S. PATENT DOCUMENTS

| | | | |
|---|---|---|---|
| 6,815,082 B2* | 11/2004 | Girt | 428/828.1 |
| 6,893,748 B2* | 5/2005 | Bertero et al. | 428/828.1 |
| 7,067,207 B2* | 6/2006 | Kamata et al. | 428/836 |
| 7,094,483 B2* | 8/2006 | Pelhos et al. | 428/832 |
| 7,498,092 B2* | 3/2009 | Berger et al. | 428/829 |
| 2004/0115481 A1 | 6/2004 | Pelhos et al. | |
| 2004/0247943 A1* | 12/2004 | Girt et al. | 428/694 T |
| 2006/0222896 A1* | 10/2006 | Inomata et al. | 428/826 |
| 2007/0072012 A1* | 3/2007 | Nakamura et al. | 428/831.2 |

FOREIGN PATENT DOCUMENTS

JP    7-73441    3/1995

(Continued)

OTHER PUBLICATIONS

Kai-Zhong Gao et al.; "Magnetic Recording Configuration for Densities Beyond 1 Tb/in$^2$ and Data Rates Beyond 1 Gb/s"; IEEE Trans. on Mag. vol. 38, No. 6, Nov. 2002; pp. 3675-3683.

*Primary Examiner*—Holly Rickman
(74) *Attorney, Agent, or Firm*—Greer, Burns & Crain, Ltd.

(57) ABSTRACT

A magnetic recording medium including a substrate having a surface, an orientation control layer disposed above the surface of the substrate, an underlayer disposed above the orientation control layer, and a recording layer having an hcp crystal structure and disposed on a surface of the underlayer. The recording layer is epitaxially grown on the surface of the underlayer to define a plurality of crystal grains, wherein the crystal grains have c-axes that are inclined in a plurality of random directions, but wherein each random direction defines an angle with respect to the surface of the substrate that is within a range that is greater than 0 degrees and less than or equal to 30 degrees. A magnetic storage apparatus including such a magnetic recording medium is also disclosed.

20 Claims, 16 Drawing Sheets

FOREIGN PATENT DOCUMENTS

| | | |
|---|---|---|
| JP | 7-141639 | 6/1995 |
| JP | 10-302242 | 11/1998 |
| JP | 11-339244 | 12/1999 |
| JP | 2004-227745 | 8/2004 |
| JP | 2005-502199 | 1/2005 |
| WO | WO 2004097809 A1 * | 11/2004 |

* cited by examiner

FIG.6

| | Cmp | Emb-1 | Emb-2 | Emb-3 | Emb-4 | Emb-5 | Emb-6 | Emb-7 | Emb-8 | Emb-9 |
|---|---|---|---|---|---|---|---|---|---|---|
| N₂ GAS CONCENTRATION (VOLUME %) | 0 | 2 | 5 | 8 | 12 | 15 | 20 | 25 | 30 | 40 |
| Co(10$\bar{1}$1) DIFFRACTION RAY INTENSITY RATIO | 10 | 40 | 55 | 80 | 95 | 100 | 100 | 100 | 100 | 100 |
| Hc1 (Oe) | 4310 | 3884 | 3864 | 3553 | 2843 | 2747 | 2756 | 2806 | 2851 | 2849 |
| Hc2 (Oe) | 1251.5 | 1215 | 1311 | 1349 | 1092.5 | 1117 | 1062 | 1092.5 | 1087 | 1095 |
| Hc2 / Hc1 | 0.29 | 0.31 | 0.34 | 0.38 | 0.38 | 0.41 | 0.39 | 0.39 | 0.38 | 0.38 |
| SQUARENESS RATIO (IN-PLANE DIRECTION) | 0.61 | 0.62 | 0.61 | 0.60 | 0.56 | 0.55 | 0.56 | 0.55 | 0.58 | 0.56 |
| AVERAGE OUTPUT (90 kfci) (dB) | 37.6 | 37.5 | 39.0 | 42.5 | 46.9 | 46.7 | 47.1 | 46.9 | 47.0 | 46.8 |
| AVERAGE OUTPUT (700 kfci) (dB) | 19.9 | 18.2 | 19.0 | 19.0 | 21.1 | 21.1 | 21.1 | 21.3 | 21.9 | 21.6 |
| S/N RATIO (dB) | 8.6 | 9.3 | 17.6 | 16.9 | 16.3 | 16.2 | 16.3 | 16.5 | 16.4 | 16.5 |
| OVERWRITE PERFORMANCE (dB) | 35.0 | 36.9 | 40.7 | 41.9 | 41.8 | 41.6 | 41.8 | 42.1 | 42.0 | 42.1 |

MAGNETIC RECORDING MEDIUM, METHOD OF PRODUCING THE SAME, AND MAGNETIC STORAGE APPARATUS

CROSS-REFERENCE TO RELATED APPLICATIONS

This application is a Continuation-In-Part Application of a U.S. patent application Ser. No. 11/211,051 filed Aug. 24, 2005 now abandoned.

BACKGROUND OF THE INVENTION

1. Field of the Invention

The present invention generally relates to magnetic recording media, methods of producing the same and magnetic storage apparatuses, and more particularly to a magnetic recording medium that includes a recording layer having Co as a main component and crystally oriented in a predetermined direction, a method of producing such a magnetic recording medium, and a magnetic storage apparatus using such a magnetic recording medium.

2. Description of the Related Art

Recently, magnetic storage apparatuses that are provided in personal computers and dynamic image recording apparatuses for home use, such as magnetic disk drives, have large storage capacities that exceed 100 GB, mainly for the purpose of recording dynamic images. The demands for even larger storage capacities and lower costs of the magnetic disk drives are likely to increase.

Presently, utilizing the in-plane (or longitudinal) magnetic recording technique in the magnetic disk drive, the recording density has been increased considerably to increase the storage capacity. Further, the signal-to-noise (S/N) ratio of the magnetic disk has been improved, and the sensitivity of the magnetic head has been increased. As a result, it has become possible to realize an in-plane recording density that exceeds 100 Gbit/in$^2$.

In the conventional in-plane magnetic recording technique and perpendicular magnetic recording technique, it is necessary to reduce the size of the crystal grains of the ferromagnetic material forming the recording layer, in order to further improve the S/N ratio at high recording densities. However, when the crystal grain size is reduced, the magnitude of the magnetization recorded in the recording layer, that is, the remanent magnetization, gradually decreases with lapse of time. In other words, the thermal stability of the recorded magnetization decreases. In order to solve this problem, a ferromagnetic material having a large anisotropic field for the recording layer can be used.

However, a new problem is introduced in that the recording becomes more difficult, that is, the recording performance deteriorates. The larger the anisotropic field of the ferromagnetic material, the larger the recording magnetic write field intensity needs to be. Moreover, the recording magnetic field intensity that can be generated by the magnetic head is limited by the material used for the write head magnetic pole. For this reason, the ferromagnetic material that can be used for the recording layer also becomes limited, and sets the limit to the achievable recording density.

In another approach to increase the recording density, a magnetic recording medium having a recording layer with the axis of easy magnetization inclined by 45 degrees with respect to the substrate surface has been theoretically proposed in Kai-Zhong Gao and H. Neal Bertram, "Magnetic Recording Configuration for Densities Beyond 1 Tb/in$^2$ and Data Rates Beyond 1 Gb/s", IEEE Transactions on Magnetics, Vol. 38, No. 6, November 2002. According to this first proposed magnetic recording medium, the angle formed by the axis of easy magnetization of the recording layer and the direction of the recording magnetic field is selected, so as to reduce the recording magnetic field intensity that is required to reverse the magnetization. In addition, by using this first proposed magnetic recording medium, it is expected that a high recording density will be realized for both the in-plane magnetic recording technique and the perpendicular magnetic recording technique. In this first proposed magnetic recording medium, it is required that the inclination direction of the magnetization of the columnar crystal grains of the recording layer is uniformly oriented in a track longitudinal direction or a track width direction. The S/N ratio of this first proposed magnetic recording medium is expected to be higher than 12 dB from the conventional perpendicular magnetic recording medium, at the recording density of 1 Tbit/in$^2$. This improvement in the S/N ratio is made possible by the fact that the anisotropic field of the recording layer can further be improved than that of the conventional perpendicular magnetic recording medium.

For example, a Japanese Laid-Open Patent Application No. 2004-227745 proposes a magnetic recording medium having at least a soft magnetic back layer and a recording layer, wherein the axis of easy magnetization of the recording layer inclined with respect to a normal to the magnetic recording medium. High resolution and S/N ratio are expected of this second proposed magnetic recording medium, without deteriorating the thermal stability of the recorded magnetization. When forming the recording layer of this second proposed magnetic recording medium, a mask plate for limiting incident grains is provided between a target and a substrate, so that only the incident grains from a direction inclined in one direction with respect to the normal to the substrate are deposited.

However, the first proposed magnetic recording medium is proposed in theory only, and Kai-Zhong Gao and H. Neal Bertram do not disclose a particular method of realizing the magnetic recording medium in which the axis of easy magnetization of the recording layer is inclined by 45 degrees with respect to the substrate surface.

On the other hand, the second proposed magnetic recording medium requires a deposition apparatus to be modified, which consequently increases the production cost. In addition, the crystal growing direction is inclined with respect to the direction of the normal to the substrate of the second proposed magnetic recording medium, by controlling the incident direction of the incident grains. The direction of the axis of easy magnetization becomes the crystal growing direction. In other words, it is difficult to control the direction of the axis of easy magnetization, because the direction of the axis of easy magnetization is controlled by the incident direction of the incident grains.

SUMMARY OF THE INVENTION

Accordingly, it is a general object of the present invention to provide a novel and useful magnetic recording medium, method of producing the same and magnetic storage apparatus, in which the problems described above are suppressed.

Another and more specific object of the present invention is to provide a magnetic recording medium, a method of producing the same and a magnetic storage apparatus, which can secure a satisfactory recording performance, improve thermal stability of recorded magnetization of a recording layer, improve the S/N ratio, and further improve the high recording density.

Still another object of the present invention is to provide a magnetic recording medium comprising a substrate having a surface; an orientation control layer disposed above the surface of the substrate; an underlayer disposed above the orientation control layer; and a recording layer having an hcp crystal structure and disposed on a surface of the underlayer, where the recording layer is epitaxially grown on the surface of the underlayer and having c-axes that are inclined with respect to the surface of the substrate. According to the magnetic recording medium of the present invention, it is possible to secure a satisfactory recording performance, improve thermal stability of recorded magnetization of a recording layer, improve the S/N ratio, and further improve the high recording density.

A further object of the present invention is to provide a magnetic recording medium comprising a substrate having a surface; an orientation control layer disposed above the surface of the substrate; an underlayer, made of Cr or a Cr alloy having Cr as a main component, and disposed above the orientation control layer; and a recording layer having an hcp crystal structure and disposed on a surface of the underlayer, where the orientation control layer is made of a non-magnetic material including nitrogen or oxygen, the recording layer is made up of a first magnetic layer, a non-magnetic coupling layer and a second magnetic layer that are successively epitaxially grown on the surface of the underlayer, the first and second magnetic layers are exchange-coupled and have magnetizations that are mutually antiparallel in a state where no external magnetic field is applied to the magnetic recording medium, and the first and second magnetic layers are made of a ferromagnetic material having an hcp crystal structure and including Co as a main component, and having c-axes that are inclined with respect to the surface of the substrate. According to the magnetic recording medium of the present invention, it is possible to secure a satisfactory recording performance, improve thermal stability of recorded magnetization of a recording layer, improve the S/N ratio, and further improve the high recording density.

Another object of the present invention is to provide a magnetic recording medium comprising a substrate having a surface; an orientation control layer disposed above the surface of the substrate; an underlayer provided on the orientation control layer and made of Cr or a Cr alloy having Cr as a main component; a third magnetic layer provided on the underlayer; an intermediate layer provided on the third magnetic layer; and a fourth magnetic layer provided on the intermediate layer, wherein the third magnetic layer is made of a ferromagnetic material having an hcp crystal structure and having Co as a main component with c-axes of the ferromagnetic material inclined with respect to the surface of the substrate, and the fourth magnetic layer is made of a ferromagnetic material having an hcp crystal structure and including Co as a main component with c-axes of the ferromagnetic material oriented in a direction approximately perpendicular with respect to the surface of the substrate. According to the magnetic recording medium of the present invention, it is possible to reverse the remanent magnetization of the third magnetic layer by a recording magnetic field intensity that is considerably smaller than an anisotropic magnetic field of the third magnetic layer. As a result, it is possible to improve the recording performance of the magnetic recording medium, such as the overwrite performance and the NLTS, and improve the S/N ratio.

Still another object of the present invention is to provide a magnetic recording medium comprising a substrate having a surface; a fifth magnetic layer disposed above the surface of the substrate; an intermediate stacked structure comprising an orientation control layer provided on the fifth magnetic layer and an underlayer provided on the orientation control layer and made of a ferromagnetic material having an hcp crystal structure and including Cr as a main component; and a sixth magnetic layer provide on the intermediate stacked structure, wherein the fifth magnetic layer is made of a ferromagnetic layer having an hcp crystal structure and including Co as a main component with c-axes of the ferromagnetic material oriented in a direction approximately perpendicular with respect to the surface of the substrate, and the sixth magnetic layer is made of a ferromagnetic material having an hcp crystal structure and including Co as a main component with c-axes of the ferromagnetic material oriented in a direction inclined with respect to the surface of the substrate. According to the magnetic recording medium of the present invention, it is possible to reverse the remanent magnetization of the sixth magnetic layer by a recording magnetic field intensity that is considerably smaller than an anisotropic magnetic field of the sixth magnetic layer. As a result, it is possible to improve the recording performance of the magnetic recording medium, such as the overwrite performance and the NLTS, and improve the S/N ratio.

Another object of the present invention is to provide a method of producing a magnetic recording medium, comprising the steps of (a) depositing a non-magnetic material on a substrate within an inert gas atmosphere including nitrogen gas or oxygen gas, so as to form an orientation control layer; (b) depositing Cr or a material including Cr as a main component on the orientation control layer, so as to form an underlayer; and (c) depositing a ferromagnetic material having an hcp crystal structure and including Co as a main component on the underlayer, so as to epitaxially grow a recording layer. According to the method of the present invention, it is possible to secure a satisfactory recording performance, improve thermal stability of recorded magnetization of a recording layer, improve the S/N ratio, and further improve the high recording density.

Still another object of the present invention is to provide a magnetic storage apparatus comprising at least one magnetic recording medium; and at least one head part configured to record information on and reproduce information from the magnetic recording medium, wherein the magnetic recording medium comprises a substrate having a surface; an orientation control layer disposed above the surface of the substrate; an underlayer disposed above the orientation control layer; and a recording layer having an hcp crystal structure and disposed on a surface of the underlayer, the recording layer being epitaxially grown on the surface of the underlayer and having c-axes that are inclined with respect to the surface of the substrate. According to the magnetic storage apparatus of the present invention, it is possible to secure a satisfactory recording performance, improve thermal stability of recorded magnetization of a recording layer, improve the S/N ratio, and further improve the high recording density.

A further object of the present invention is to provide a magnetic storage apparatus comprising at least one magnetic recording medium; and at least one head part configured to record information on and reproduce information from the magnetic recording medium, wherein the magnetic recording medium comprises a substrate having a surface; an orientation control layer disposed above the surface of the substrate; an underlayer, made of Cr or a Cr alloy having Cr as a main component, and disposed above the orientation control layer; and a recording layer having an hcp crystal structure and disposed on a surface of the underlayer, the orientation control layer being made of a non-magnetic material including nitrogen or oxygen, the recording layer being made up of a first magnetic layer, a non-magnetic coupling layer and a second magnetic layer that are successively epitaxially grown on the surface of the underlayer, the first and second magnetic layers being exchange-coupled and having magnetizations that are mutually antiparallel in a state where no external magnetic field is applied to the magnetic recording medium, the first and second magnetic layers being made of a ferromagnetic material having an hcp crystal structure and including Co as a main component, and having c-axes that are inclined with respect to the surface of the substrate. According to the magnetic storage apparatus of the present invention, it is possible to secure a satisfactory recording performance, improve thermal stability of recorded magnetization of a recording layer, improve the S/N ratio, and further improve the high recording density.

Other objects and further features of the present invention will be apparent from the following detailed description when read in conjunction with the accompanying drawings.

BRIEF DESCRIPTION OF THE DRAWINGS

FIG. 6 is a diagram showing characteristics of the first embodiment of the magnetic recording medium and a comparison sample of the magnetic recording medium;

DESCRIPTION OF THE PREFERRED EMBODIMENTS

Figure 1A:
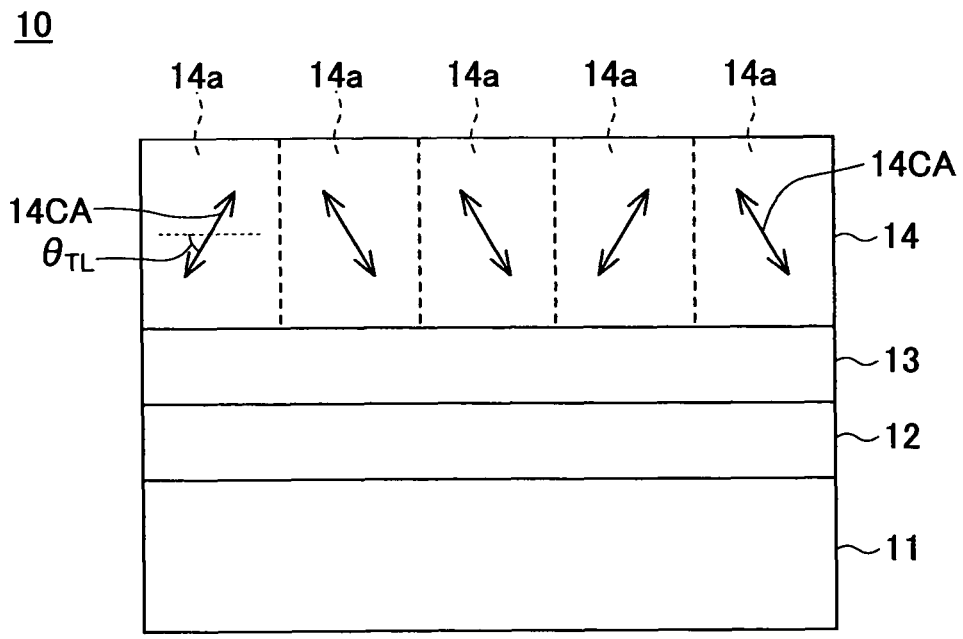
FIGS. 1A and 1B are diagrams for explaining an operating principle of the present invention.
Figure 1B:
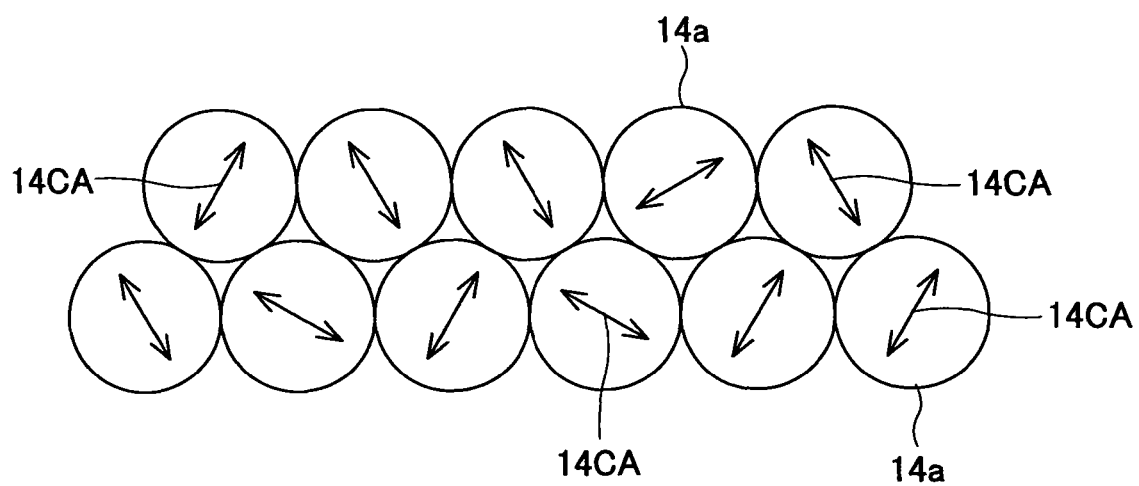

FIGS. 1A and 1B are diagrams for explaining an operating principle of the present invention. FIG. 1A is a cross sectional view showing an important part of a magnetic recording medium 10 according to the present invention, and FIG. 1B is a plan view schematically showing crystal grains of a recording layer 14.

As shown in FIG. 1A, an important part of the magnetic recording medium 10 of the present invention includes a substrate 11, and an orientation control layer 12, an underlayer 13 and the recording layer 14 that are successively formed on the substrate 11. The orientation control layer 12 is made of a non-magnetic material including nitrogen or oxygen, such as CrTi including nitrogen. The underlayer 13 is made of Cr or a Cr alloy having Cr as a main component (such that the Cr content is greater than 50 at. %). The recording layer 14 is made of a ferromagnetic material having a hcp (hexagonal close packed) crystal structure and Co as a main component (such that the Co content is greater than 50 at. %), and is a polycrystalline substance made up of a large number of crystal grains 14$a$.

The present inventor has found that the underlayer 13 and the recording layer 14 can be formed with a specific crystal orientation by depositing CrTi or the like as the orientation control layer 12 by a sputtering within an atmosphere having a nitrogen gas or an oxygen gas added to an inert gas. In other words, the present inventor has found that the crystal grains 14$a$ made of the ferromagnetic material having the hcp crystal structure and forming the recording layer 14 are deposited in such a manner that c-axes 14CA of the crystal grains 14$a$ are inclined with respect to a surface that is parallel to a surface of the substrate 11 (hereinafter simply referred to as a "substrate surface").

A description will now be given of the operating principle of the present invention.

The c-axis 14CA of the crystal grain 14$a$ of the recording layer 14 is the axis of easy magnetization. The axis of easy magnetization is the direction in which the magnetic energy dependent on the magnetization direction of the crystal grain 14$a$ becomes most stable. In other words, the magnetization of the crystal grain 14$a$ is oriented in the axis of easy magnetization or the c-axis 14CA, in a state where no magnetic field is applied thereto.

As shown in FIG. 1A, the c-axis 14CA of the crystal grain 14$a$ forms a predetermined inclination angle $\theta_{TL}$ with respect to the substrate surface. As will be described later, this is because the crystal orientation of the underlayer 13 becomes a specific direction and the recording layer 14 is epitaxially grown on the surface of the underlayer 13, due to effects of the orientation control layer 12.

When the recording layer 14 shown in FIG. 1A is viewed from above as shown in FIG. 1B, the c-axes 14CA of each of the crystal grains 14a are oriented in random directions. In other words, the components of the c-axes 14CA of each of the crystal grains 14a, parallel to the substrate surface (that is, in an "in-plane direction"), are at random, that is, isotropic, due to the crystal matching of the underlayer 13 and the recording layer 14, as will be described hereinafter.

Next, a description will be given of the crystal matching of the underlayer 13 and the recording layer 14, which is used in the operating principle of the present invention.

Figure 2A:
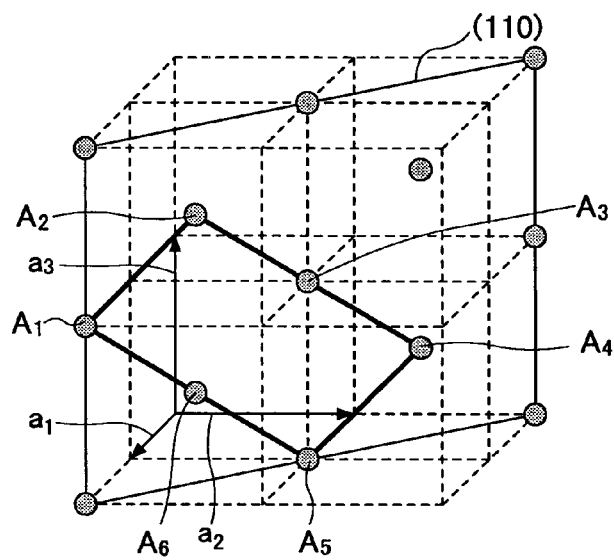
FIGS. 2A through 2E are diagrams for explaining crystal lattice matching of an underlayer and a recording layer in the present invention.
Figure 2B:
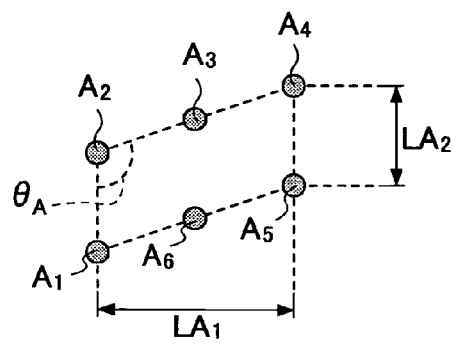
Figure 2C:
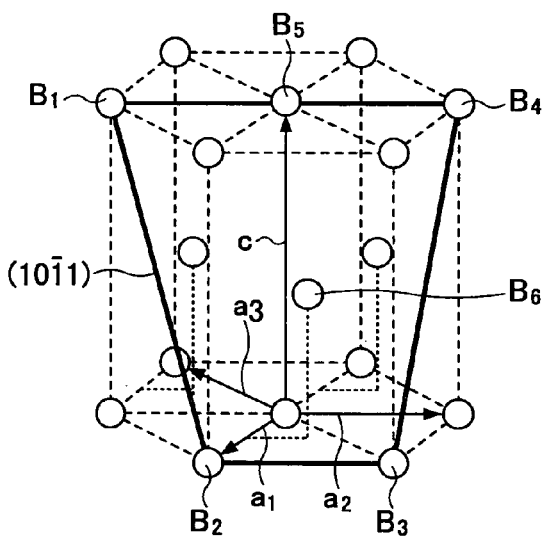
Figure 2D:
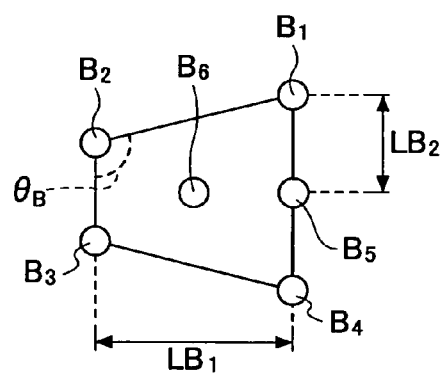
Figure 2E:
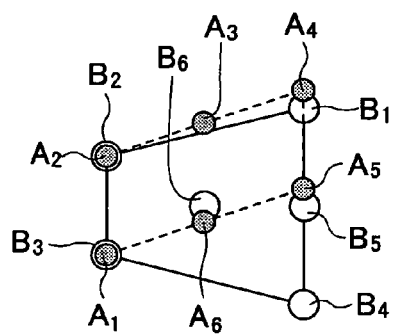

FIGS. 2A through 2E are diagrams for explaining crystal matching states of the underlayer 13 and the recording layer 14 in the present invention. FIG. 2A shows a crystal structure of Cr forming the underlayer 13, FIG. 2B shows a portion of a (110) crystal face of Cr, FIG. 2C shows a crystal structure of Co forming the recording layer, FIG. 2D shows a portion of a (10-11) crystal face of Co, and FIG. 2E shows a matching state of the (110) crystal face of Cr and the (10-11) crystal face of Cr, where "(10-11)" indicates "('one', 'zero', 'one bar' and 'one')".

As shown in FIG. 2A, the Cr forming the underlayer 13 has a bcc (body centered cubic) crystal structure. Coordinate axes of the bcc crystal structure, namely, a1-axis, a2-axis and a3-axis, are indicated by mutually perpendicular arrows. If unit vectors of the a1-axis, a2-axis and a3-axis are respectively denoted by a1, a2 and a3, a position of a Cr atom indicated by a symbol A1 is represented by 2×a1+0×a2+1×a3. It is assumed that the position coordinate of the Cr atom A1 is represented by [2, 0, 1] by arranging coefficients of the unit vectors a1, a2 and a3 in this order.

A lattice formed by 6 Cr atoms A1 through A6 on the (110) crystal face is obtained. The position coordinates of the 6 Cr atoms A1 through A6 are [2, 0, 1] for A1, [3/2, 1/2, 3/2] for A2, [1, 1, 1] for A3, [1/2, 3/2, 1/2] for A4, [1, 1, 0] for A5 and [3/2, 1/2, 1/2] for A6.

As shown in FIG. 2B, in the case of Cr only, the lattice formed by 6 Cr atoms A1 through A6 has a distance LA1=0.472 nm between a side made up of A1 and A2 and a side made up of A4 and A5, a distance LA2=0.250 nm between A4 and A5 (or A1 and A2), and an angle $\theta_A$=109 degrees formed between a side made up of A1 and A2 and a side made up of A2, A3 and A4.

On the other hand, as shown in FIG. 2C, Co has the hcp crystal structure. Coordinate axes of the hcp crystal structure, namely, a1-axis, a2-axis and a3-axis that mutually form a 120 angle within the c-plane, and the c-axis that is perpendicular to the a1-axis, the a2-axis and the a3-axis, are indicated by arrows. If unit vectors of the a1-axis, a2-axis, a3-axis and c-axis are respectively denoted by a1, a2, a3 and c, a position of a Co atom indicated by a symbol B1 is represented by 1×a1+0×a2+1×a3+1×c. It is assumed that the position coordinate of the Co atom B1 is represented by [1, 0, 1, 1] by arranging coefficients of the unit vectors a1, a2, a3 and c in this order.

A lattice formed by 6 Co atoms B1 through B6 on the (10-11) crystal face is obtained. The position coordinates of the 6 Co atoms B1 through B6 are [1, 0, 1, 1] for B1, [1, 0, 0, 0] for B2, [1, 1, 0, 0] for B3, [0, 1, 0, 1] for B4, [0, 0, 0, 1] for B5 and [2/3, 1/3, 0, 1/2].

As shown in FIG. 2D, in the case of pure Co, the lattice formed by 6 Co atoms B1 through B6 has a distance LB1=0.461 nm between a side made up of B2 and B3 and a side made up of B4, B5 and B1, a distance LB2=0.250 nm between B1 and B5 (or B2 and B3), and an angle $\theta_B$=105 degrees formed between the side made up of B2 and B3 and a side made up of B2 and B1.

As shown in FIG. 2E, the lattice formed by the 6 Cr atoms A1 through A6 and the lattice formed by the 6 Co atoms B1 through B6 have the distances LA1 and LB1, the distances LA2 and LB2, and the angle $\theta_A$ and $\theta_B$ shown in FIGS. 2B and 2D that are approximately the same (approximately match). It may be regarded that the recording layer 14 is epitaxially grown on the underlayer 13 in such a manner that the lattice formed by the 6 Co atoms B1 through B6 overlaps the lattice formed by the 6 Cr atoms A1 through A6, due to this matching of the lattices. The angle formed by the (10-11) crystal face and the c-axis shown in FIG. 2C is 28 degrees, and the (10-11) crystal face becomes parallel to the substrate surface. Thus, the c-axis becomes approximately 28 degrees with respect to the substrate surface. Therefore, in the magnetic recording medium of the present invention, the c-axis of the recording layer 14 is inclined with respect to the substrate surface, that is, the magnetic recording medium is a so-called oblique orientation magnetic recording medium.

From calculation, the (0002) crystal face or the like of Co should form a lattice matching on the (110) crystal face of Cr. However, according to structural analysis made by the present inventor using the X-ray diffraction method and the like, it was found that the (0002) crystal face is not formed on the recording layer 14 of the magnetic recording medium having the structure of the present invention.

Figure 3A:
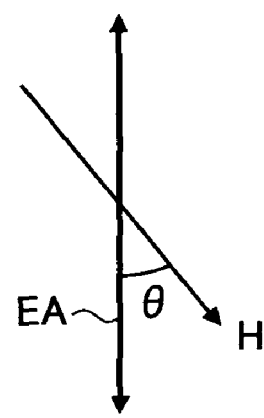
FIGS. 3A and 3B are diagrams for explaining effects of the present invention.
Figure 3B:
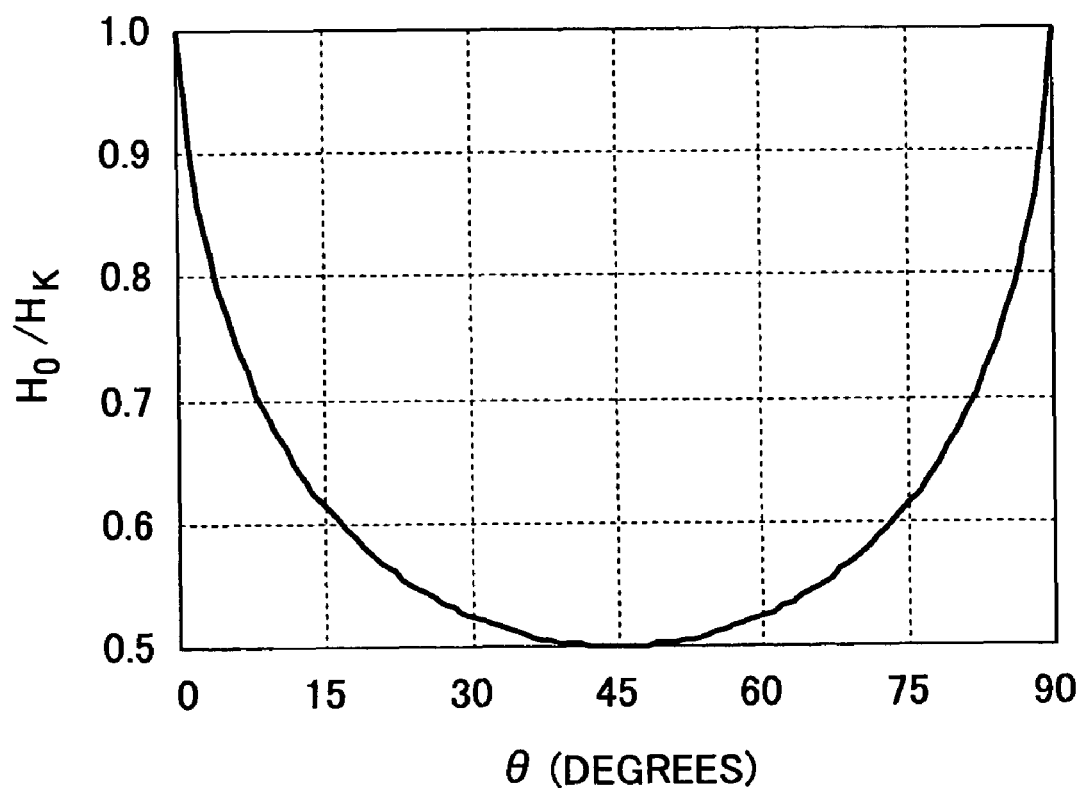

FIGS. 3A and 3B are diagrams for explaining effects of the present invention. FIG. 3A is a diagram showing a relationship of directions of a magnetic easy axis EA (that is, axis of easy magnetization) and a recording magnetic field H. The ordinate in FIG. 3B is obtained by normalizing a recording magnetic field intensity $H_0$ that is required to rotate the magnetization by an anisotropic magnetic field $H_k$. The anisotropic magnetic field $H_k$ is the magnetic field intensity that is required to reverse the magnetization by applying a recording magnetic field in a direction opposite to the direction of the magnetization, in a case where the direction of the magnetization is parallel to the direction of the magnetic easy axis EA. The abscissa in FIG. 3B indicates an angle θ shown in FIG. 3A. Hence, a relationship shown in FIG. 3B is the so-called Stoner-Wolfarth's model.

In FIG. 3A, it is assumed that the angle θ is formed by the c-axis of the recording layer 14, that is, the magnetic easy axis AE, and the direction of the recording magnetic field H that is applied at the time of the recording.

In FIG. 3B, in a case where the angle θ is close to 0 degree or 90 degrees, $H_0/H_k$ takes a value close to 1, and $H_0/H_k$ takes a minimum value when the angle θ is 45 degrees. In other words, the recording magnetic field intensity $H_0$ that is required to reverse the magnetization has a magnitude that is approximately same as that of the anisotropic magnetic field Hk when the angle θ is 0 degree or 90 degrees, but takes a minimum value when the angle θ is 45 degrees.

For example, in the case of the in-plane magnetic recording medium, the magnetic easy axis EA is parallel to the substrate surface, and the direction of the recording magnetic field H is also parallel to the substrate surface. Hence, the angle θ in this case is 0 degree, and $H_0/H_k$ becomes 1. On the other hand, in the case of the perpendicular magnetic recording medium, the magnetic easy axis EA is perpendicular with respect to the substrate surface, and the direction of the recording magnetic field H is also perpendicular to the substrate surface. Thus, the magnetic easy axis EA and the direction of the recording magnetic field H are parallel to each other, and the angle θ in this case is also 0 degree and $H_O/H_k$ is 1. Accordingly, in the conventional in-plane magnetic recording medium and the conventional perpendicular magnetic recording medium, the recording magnetic field intensity $H_O$ that is required to reverse the magnetization is approximately equal to the anisotropic magnetic field $H_k$.

On the other hand, in the magnetic recording medium of the present invention, the magnetic easy axis AE is inclined by 28 degrees with respect to the substrate surface in the case where an ideal orientation is achieved, and $H_O/H_k$ is approximately 0.54. This means that the recording magnetic field intensity $H_O$ that is required to reverse the magnetization is only approximately ½ the anisotropic magnetic field $H_k$. Therefore, the problem of unsatisfactory recording is unlikely to occur in the magnetic recording medium of the present invention, and it is possible to use a material having a large anisotropic magnetic field $H_k$. As a result, according the magnetic recording medium of the present invention, it is possible to improve the thermal stability of the recorded magnetization. In addition, it is possible to further reduce the crystal grain size of the recording layer, due to the improved thermal stability of the recorded magnetization. For this reason, it is possible to reduce the medium noise and to improve the S/N ratio of the magnetic recording medium.

As characteristics required of the recording head that is used to record information on the magnetic recording medium of the present invention, it is possible to reduce the recording magnetic field intensity $H_O$. Hence, the magnetic recording medium of the present invention has the effect of facilitating the design of the recording head.

Therefore, according to the magnetic recording medium of the present invention, it is possible to solve the problems that could not be simultaneously solved and/or achieve the objects that could not be simultaneously achieved in the conventional magnetic recording medium. More particularly, according to the present invention, it is possible to secure a satisfactory recording performance or ease of recording, improve the thermal stability of the magnetization recorded in the recording layer, improve the S/N ratio, and secure a high recording density.

Next, a description will be given of embodiments of the present invention, by referring to FIG. 4 and the subsequent figures.

First Embodiment

Figure 4:
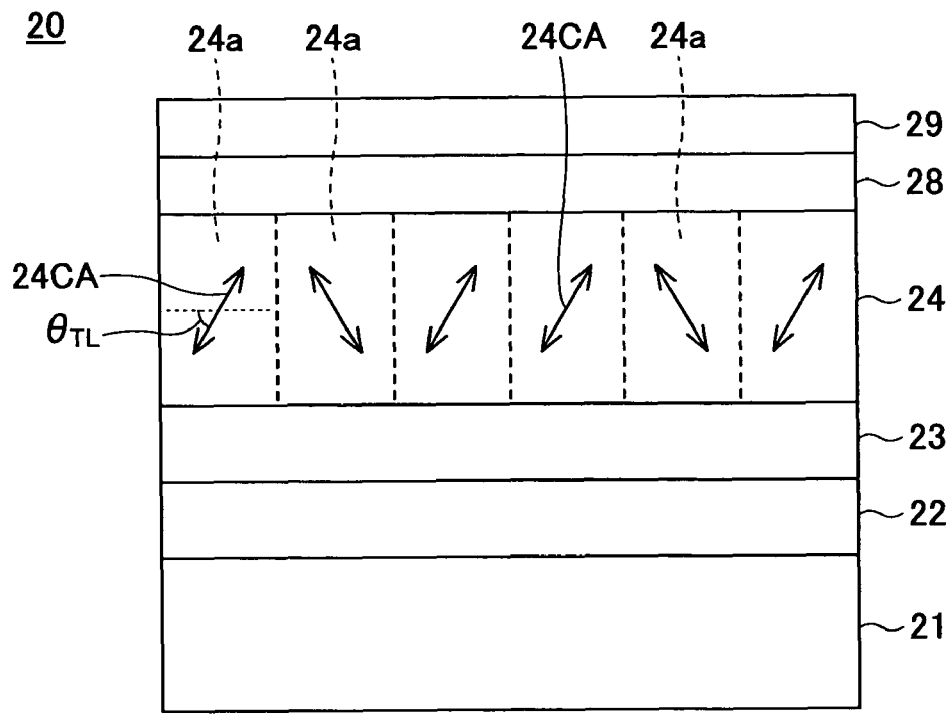
FIG. 4 is a cross sectional view showing a first embodiment of a magnetic recording medium according to the present invention.

FIG. 4 is a cross sectional view showing a first embodiment of the magnetic recording medium according to the present invention. In FIG. 4, each arrow schematically shows a c-axis CA of a crystal grain. Similar designations are used in figures which follow.

A magnetic recording medium 20 shown in FIG. 4 includes a substrate 21, and an orientation control layer 22, an underlayer 23, a recording layer 24, a protection layer 28 and a lubricant layer 29 that are successively formed on the substrate 21.

A material used for the substrate 21 is not limited to a particular material. For example, glass substrates, NiP plated Al alloy substrates, ceramic substrates, plastic substrates, Si substrates and the like may be used for the substrate 21. The substrate 21 may have a disk shape or a tape shape. In a case where the substrate 21 has the tape shape, plastic films such as PET, PEN and polyimide may be used for the substrate 21.

The orientation control layer 22 has a thickness in a range of 1 nm to 150 nm, for example, and is made of a non-magnetic material including nitrogen or oxygen. The nitrogen or oxygen included in the orientation control layer 22 may be introduced from the atmosphere when depositing the orientation control layer 22 or, included in advance in a sputtering target that is used.

Suitable non-magnetic materials for the orientation control layer 22 include amorphous metals such as NiP, AlV, AlTi, CoW and CrTi and including nitrogen or oxygen.

Moreover, suitable non-magnetic materials for the orientation control layer 22 also include crystalline metals such as RuAl, NiAl and FeAl having a B2 crystal structure, and crystalline metals such as Cr, CrNb, CrW, CrMo and CrV having a bcc crystal structure, and including nitrogen or oxygen. Furthermore, suitable non-magnetic materials for the orientation control layer 22 further include materials selected from a group consisting of Au, Al, Ag, Pt and alloys thereof (that is, alloys including at least one of such elements) having an fcc crystal structure, and including nitrogen or oxygen.

The orientation control layer 22 may be formed from the amorphous metal, crystalline metal or material having the fcc crystal structure, by vacuum deposition (or vacuum evaporation) or sputtering, within a gas atmosphere including an inert gas and nitrogen gas or oxygen gas. Details of the formation of the orientation control layer 22 will be described later in the specification.

The underlayer 23 has a thickness in a range of 1 nm to 150 nm, for example, and is made of a material selected from a group consisting of Cr and Cr alloys having Cr as a main component such that the Cr content is greater than 50 at. %. The Cr alloys may be a Cr—X1 alloy having a bcc crystal structure, where the added element X1 is selected from a group consisting of W, Mo, Nb, Ta, V and alloys thereof (that is, alloys including at least one of such elements). More preferably, the underlayer 23 has a thickness in a range of 5 nm to 30 nm.

The underlayer 23 is made of a polycrystalline substance made up of a large number of crystal grains. The crystal grains of the underlayer 23 grow so that the (110) crystal face is perpendicular to the substrate surface, due to the effects of the orientation control layer 22. As a result, the (110) crystal face appears on the surface of the underlayer 23, and the (10-11) crystal face of the recording layer 24 that is formed on the underlayer 23 becomes lattice matched to the (110) crystal face of the underlayer 23, such that crystal grains 24a of the recording layer 24 have c-axes 24CA that are inclined.

The lattice constant of the underlayer 23 may be controlled by appropriately controlling the kind and the content (amount) of the added element X1. By controlling the lattice constant of the underlayer 23, it is possible to improve the lattice matching of the (110) crystal face of the underlayer 23 and the (10-11) crystal face of the recording layer 24. The Cr and the Cr alloys including Cr as the main component such that the Cr content is greater than 50 at. %, that may be used for the underlayer 23, may further include nitrogen or oxygen.

The recording layer 24 has a thickness in a range of 5 nm to 30 nm, for example, and is made of a ferromagnetic material having Co as a main component such that the Co content is greater than 50 at. % and having an hcp crystal structure. For example, the recording layer 24 may be made of a material selected from a group consisting of CoCr, CoCr alloys, CoPt, CoCrPt, CoCrTa and CoCrPt alloys. The CoCrPt alloys may be a CoCrPt-M alloy, where the added element M is selected from a group consisting of B, Mo, Nb, Ta, W, Cu and alloys thereof (that is, alloys including at least one of such elements). The CoCrPt-M alloy is preferable in that the crystal grain size (or grain diameter) of the crystal grains 24a is controllable. From the point of view of obtaining a large anisotropic magnetic field, the recording layer 24 is preferably made of a material selected from a group consisting of CoCrPt and CoCrPt alloys.

The protection layer 28 has a thickness in a range of 0.5 nm to 10 nm, for example, and is made of a material such as amorphous carbon, diamond-like carbon (DLC) and carbon nitride.

In the magnetic recording medium 20, the underlayer 23 grows with the (110) crystal face parallel to the substrate surface, due to the effects of the orientation control layer 22. In addition, by epitaxially growing the recording layer 24 on the surface of the underlayer 23, the c-axis 24CA of the crystal lattice of the recording layer 24 is formed with an inclination with respect to the substrate-surface.

The recording layer 24 is formed by the polycrystalline substance of the crystal grains 24a made of the material described above. The crystal grains 24a grow epitaxially on the surface of the underlayer 23, and are formed in the direction approximately perpendicular to the substrate surface. In other words, the (110) crystal face appears at the surface of the underlayer 23 due to the effects of the orientation control layer 22. The crystal grains 24a of the recording layer 24 grow on the (110) crystal face of the underlayer 23 such that the (10-11) crystal face of the crystal grains 24a is lattice matched to the (110) crystal face of the underlayer 23. Accordingly, the (10-11) crystal face of the crystal grains 24a becomes parallel to the substrate surface. The c-axes 24CA of the crystal grains 24a are inclined by approximately 28 degrees with respect to the (10-11) crystal face. Hence, the c-axes 24CA of the crystal grains 24a become inclined by approximately 28 degrees with respect to the substrate surface. When all of the crystal grains 24a assume such an inclined state, it may be regarded, by taking into consideration the distribution of the directions of the c-axes 24CA, that the c-axes 24CA become inclined in a range of 28 degrees±2 degrees with respect to the substrate surface.

The lattice constants and the directions of the crystal faces have a distribution for each of the crystal grains 24a of the recording layer 24, and the directions of the c-axes 24CA have a distribution depending on the extent of the effects of the orientation control layer 22. The c-axes 24CA of the crystal grains 24a become inclined by an angle in a range greater than 0 degree to and less than or equal to 30 degrees with respect to the substrate surface. From the point of view of being able to reduce the recording magnetic field intensity $H_0$, it is preferable that the c-axes 24CA of the crystal grains 24a of the recording layer 24 are inclined by an angle in a range greater than or equal to 25 degrees and less than or equal to 30 degrees. As will be described later in conjunction with embodiment samples, such a range of the inclination of the c-axes 24CA with respect to the substrate surface may be obtained by setting the nitrogen gas concentration or oxygen gas concentration to 10 volume % when forming the orientation control layer 22. The c-axes 24CA of the crystal grains 24a may be measured by the X-ray diffraction method.

Figure 5:
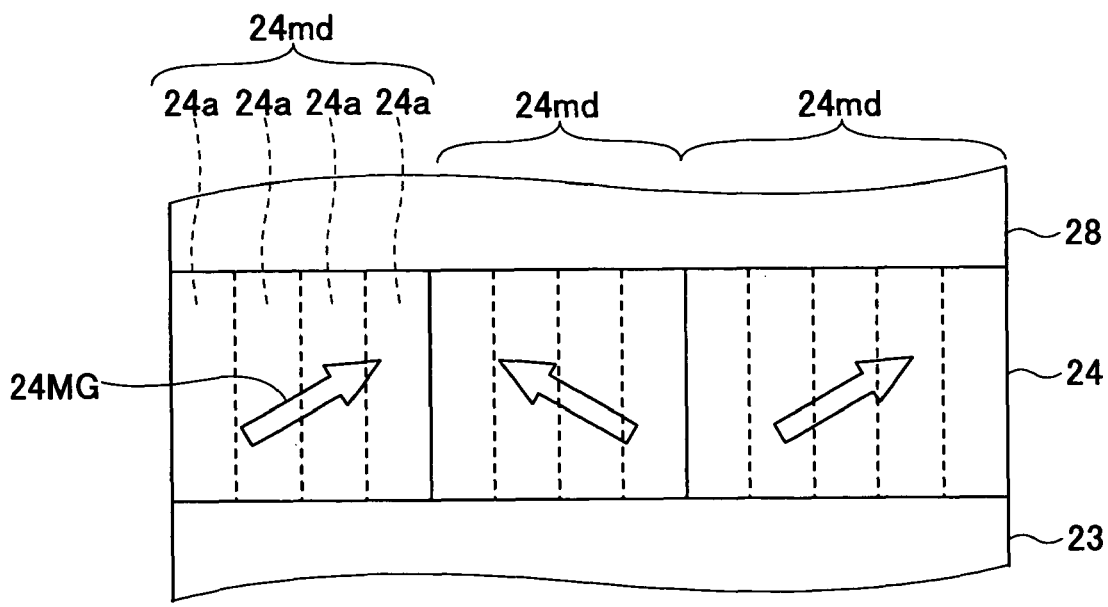
FIG. 5 is a diagram schematically showing a state of a recording layer of the first embodiment of the magnetic recording medium after recording.

FIG. 5 is a diagram schematically showing a state of the recording layer 24 of the first embodiment of the magnetic recording medium after recording. FIG. 5 shows a cross section of the magnetic recording medium 20 taken along a recording direction.

Referring to FIG. 5 and FIG. 4, when a recording operation is carried out, a recording magnetic field H which alternatively reverses direction along the in-plane direction is applied to the recording layer 24 by a recording head (not shown) employing the in-plane magnetic recording technique, to thereby form a plurality of magnetization regions 24md. Each magnetization region 24md is made up of a plurality of crystal grains 24a. A remanent magnetization 24MG is formed in the magnetization region 24md, in a direction indicated by an arrow. It may be regarded that the directions of the remanent magnetizations 24MG of the magnetization regions 24md alternately become upwardly inclined towards the right and upwardly inclined towards the left. The remanent magnetizations 24MG are inclined by 28 degrees, for example, with respect to the substrate surface, that is, a plane parallel to the surface of the underlayer 23 shown in FIG. 5. The remanent magnetization 24MG of the magnetization region 24md is a collection of remanent magnetizations formed in each of the crystal grains 24a forming the magnetization region 24md.

When newly recording information on the recording layer 24 having the remanent magnetizations 24MG described above, the recording magnetic field H is applied in a direction approximately along the in-plane direction. Hence, the direction of the recording magnetic field H and the direction of the remanent magnetization 24MG form an angle of 28 degrees, for example, and as described above in conjunction with FIG. 3B, the remanent magnetization 24MG can be reversed by the recording magnetic field intensity $H_0$ that is considerably smaller than the anisotropic magnetic field $H_k$ of the recording layer 24.

As described above, the magnetic recording medium 20 of this first embodiment is provided with the orientation control layer 22 which causes the c-axis 24CA of each of the crystal grains 24a of the recording layer 24 to become inclined with respect to the substrate surface. Accordingly, it is possible to reduce the recording magnetic field intensity $H_0$ that is required at the time of the recording. Consequently, in the magnetic recording medium 20 of this embodiment, the anisotropic magnetic field $H_k$ of the recording layer 24 can be increased, and the thermal stability of the magnetization recorded in the recording layer 24 can be improved. Furthermore, according to the magnetic recording medium 20 of this embodiment, it is possible to reduce the size (or grain diameter) of the crystal grains 24a of the recording layer 24 while at the same time improving the thermal stability of the recorded magnetization, and as a result, it is possible to improve the S/N ratio of the magnetic recording medium 20.

Although illustration thereof is omitted in FIG. 4, an intermediate layer may be provided between the underlayer 23 and the recording layer 24. The intermediate layer has a thickness in a range of 1 nm to 5 nm, for example, and is made of a non-magnetic alloy having an hcp crystal structure, such as a CoCr alloy added with X2 (CoCr—X2), where X2 is an element or an alloy selected from a group consisting of Pt, B, Mo, Nb, Ta, W, Cu and alloys thereof (that is, alloys including at least one of such elements). Alternatively, the intermediate layer may be made of a magnetic material of a comparable thickness and having an hcp crystal structure, such as CoCr—X2, with a saturation magnetization of 50 G or less. The intermediate layer is epitaxially grown on the underlayer 23 so that the (10-11) crystal face of the intermediate layer is lattice matched to the (110) crystal face of the underlayer 23, and the recording layer 24 is epitaxially grown on the intermediate layer so that the (10-11) crystal face of the recording layer 24 is lattice matched to the (10-11) crystal face of the intermediate layer. Therefore, by providing the intermediate layer, it is possible to improve the lattice matching of the underlayer 23 and the recording layer 24, and to improve the crystallinity of the recording layer 24.

Next, a description will be given of an embodiment of a method of producing the magnetic recording medium according to the present invention, by referring to FIG. 4.

First, a substrate 21 having a clean surface is set within a chamber of a sputtering apparatus, such as a DC magnetron sputtering apparatus, and heated to a temperature of approximately 180° C., for example. The inside of the chamber of the DC magnetron sputtering apparatus is preferably exhausted in advance to a vacuum of $1 \times 10^{-5}$ Pa or less, and thereafter supplied with an inert gas such as Ar or a process gas.

Then, the orientation control layer 22 is formed within an atmosphere including nitrogen gas or oxygen gas. More particularly, the nitrogen gas or the oxygen gas and the Ar gas are supplied within the chamber. The concentration of the nitrogen gas or the oxygen gas is set to 2 volume % to 40 volume %, and preferably to 5 volume % to 40 volume %. The range of the nitrogen or oxygen gas concentration was obtained from the embodiment samples which will be described later. The nitrogen or oxygen gas concentration may of course be set higher than 40 volume % and so that the plasma is stably formed. A pressure within the chamber is set in a range of 0.665 Pa to 3.99 Pa, for example. A target that is used to form the orientation control layer 22 is made of the non-magnetic material described above that is used for the orientation control layer 22 but including on nitrogen or oxygen. The orientation control layer 22 is formed on the substrate 21 under these conditions. It is preferable that the substrate temperature is set in a range of 25° C. to 250° C., for example.

The target used to form the orientation control layer 22 may be made of a non-magnetic material including nitrogen or oxygen. In this case, the orientation control layer 22 may be formed within an inert gas atmosphere that does not include nitrogen or oxygen or, within an inert gas atmosphere including nitrogen or oxygen.

Next, the underlayer 23 is formed on the orientation control layer 22. The underlayer 23 is deposited within an inert gas atmosphere using the Cr or Cr alloy described above. The underlayer 23 may be formed within a nitrogen gas atmosphere or an oxygen gas atmosphere.

Then, the recording layer 24 is formed on the underlayer 23. The recording layer 24 is deposited within an inert gas atmosphere using a target that is made of the ferromagnetic material described above having Co as the main component such that the Co content is greater than 50 at. %.

Thereafter, the protection layer 28 is formed on the recording layer 24 by sputtering, CVD, FCA or the like. The lubricant layer 29 is then formed on the protection layer 28. More particularly, the lubricant layer 29 is formed by coating, on the protection layer 28, a diluted lubricant solution by dipping, spin-coating or the like. The magnetic recording medium 20 of the first embodiment is formed in this manner by this embodiment of the method.

According to this embodiment of the method of producing the magnetic recording medium, the orientation control layer 22 is formed by depositing the non-magnetic material within the atmosphere including the nitrogen gas or the oxygen gas, the underlayer 23 is formed on the orientation control layer 22 by depositing the Cr or the material having Cr as the main component such that the Cr content is greater than 50 at. %, and the recording layer 24 is formed on the underlayer 23 or via the intermediate layer by depositing the ferromagnetic material having the hcp crystal structure and including Co as the main component such that the Co content is greater than 50 at. %. By the effects of the orientation control layer 22, the recording layer 24 is formed so that the c-axes 24CA of the crystal grains 24a of the recording layer 24 become inclined with respect to the substrate surface.

Embodiment Samples Emb-1 To Emb-9 & Comparison Sample Cmp

Next, a description will be given of the embodiment samples Emb-1 through Emb-9 in accordance with the first embodiment of the magnetic recording medium, in comparison with the comparison sample Cmp. The embodiment samples Emb-1 through Emb-9 were produced by using different nitrogen gas concentrations for the atmosphere in which the orientation control layer 22 is deposited. The following structure was used for each of the embodiment samples Emb-1 through Emb-9.

Substrate 21: Glass substrate with diameter of 65 mm;
Orientation Control Layer 22: CrTi layer including nitrogen with a thickness of 20 nm;
Underlayer 23: Cr layer with a thickness of 100 nm;
Recording Layer 24: CoCrPt layer with a thickness of 20 nm;
Protection Layer 28: Carbon layer with a thickness of 4.5 nm; and
Lubricant Layer 29: Perfluoropolyether layer with a thickness of 1.5 nm.

Each of the embodiment samples Emb-1 through Emb-9 were made under the following conditions. First, the glass substrate 21 was heated by a heater to 170° C. in vacuum, prior to forming the CrTi orientation layer 22. Then, the CrTi orientation layer 22 was formed in an atmosphere including nitrogen gas an Ar gas at a pressure of 0.67 Pa, using a DC magnetron sputtering apparatus. The nitrogen gas concentration within the atmosphere was changed in a range of 2 volume % to 40 volume %, as will be described later in conjunction with FIG. 6. In addition, the comparison sample Cmp was also made under the same conditions, except for the nitrogen gas concentration which was set to 0 volume %. Next, the Cr underlayer 23, the CoCrPt recording layer 24 and the carbon protection layer 28 were successively formed on the CrTi orientation control layer 22 within an Ar gas atmosphere at a pressure of 0.67 Pa, using the DC magnetron sputtering apparatus. Thereafter, the perfluoropolyether lubricant layer 29 was formed on the carbon protection layer 28 by dipping.

FIG. 6 is a diagram showing characteristics of the embodiment samples Emb-1 through Emb-9 according to the first embodiment of the magnetic recording medium and the comparison sample Cmp of the magnetic recording medium. The embodiment samples Emb-1 through Emb-9 and the comparison sample Cmp were made under the same conditions except for the nitrogen gas concentration of the atmosphere in which the orientation control layer 22 was formed.

In FIG. 6, a Co(10-11) diffraction ray intensity ratio represents the peak intensity of the diffraction ray corresponding to Co(10-11) of each of the embodiment samples Emb-1 through Emb-9 and the comparison sample Cmp in percentage, with respect to the peak intensity of the diffraction ray corresponding to Co(10-11) of the embodiment sample Emb-9 which is taken as a reference (100%). The larger the Co(10-11) diffraction ray intensity ratio, the higher the ratio of the crystal grains that are oriented in the Co(10-11). Compared to the comparison sample Cmp, the Co(10-11) diffraction ray intensity ratio of the embodiment sample Emb-1 using the nitrogen gas concentration of 2 volume % is increased. In addition, the Co(10-11) diffraction ray intensity ratio increases as the nitrogen gas concentration increases. The Co(10-11) diffraction ray intensity ratio approximately saturates for the nitrogen gas concentration of 12 volume % or greater, that is, for the embodiment samples Emb-5 through Emb-9. For the nitrogen gas concentrations of 2 volume % or greater, that is, for the embodiment samples Emb-1 through Emb-9, no diffraction ray originating from Co was confirmed other than the diffraction ray corresponding to Co(10-11).

Accordingly, from the Co(10-11) diffraction ray intensity ratio, it may be seen that the (10-11) orientation of the CoCrPt recording layer 24 occurs in the magnetic recording media (magnetic disks) according to the embodiment samples Emb-1 through Emb-9 using the nitrogen gas concentrations of 2 volume % or greater, and it was confirmed that virtually all of the crystal grains 24a of the CoCrPt recording layer 24 have the (10-11) orientation for the nitrogen gas concentrations of 2 volume % or greater.

In addition, a coercivity Hc1 of the CoCrPt recording layer 24 in the in-plane direction (hereinafter referred to as an in-plane coercivity Hc1) for the embodiment samples Emb-1 through Emb-9 decreases as the nitrogen gas concentration increases with respect to that of the comparison sample Cmp. On the other hand, a coercivity Hc2 of the CoCrPt recording layer 24 in the direction perpendicular to the substrate surface (hereinafter referred to as a perpendicular coercivity Hc2) increases for the embodiment samples Emb-2 and Emb-3 using the low nitrogen gas concentrations with respect to that of the comparison sample Cmp, but for the embodiment samples Emb-4 through Emb-9 using the nitrogen gas concentrations of 12 volume % or greater the perpendicular coercivity Hc2 decreases and becomes approximately constant with respect to that of the comparison sample Cmp.

A coercivity ratio Hc1/Hc2 of the in-plane coercivity Hc1 to the perpendicular coercivity Hc2 is 0.29 for the comparison sample Cmp, but increases for the embodiment sample Emb-1 using the nitrogen gas concentration of 2 volume %, and takes a value in a range of 0.31 to 0.41 for the embodiment samples Emb-2 through Emb-9 using the nitrogen gas concentrations in a range of 2 volume % to 40 volume %. In the case of the comparison sample Cmp, the angle of the c-axis of the recording layer with respect to the substrate surface is approximately 0 degree. Accordingly, according to the characteristics of the coercivity ratios described above, it may be seen that the angle of the c-axes 24CA of the CoCrPt recording layers 24 with respect to the substrate surface for the magnetic disks according to embodiment samples Emb-1 through Emb-9 using the nitrogen gas concentrations of 2 volume % or greater is increased from that of the comparison sample Cmp.

A squareness ratio (=[remanent magnetization]/[saturation magnetization]) in the in-plane direction notably decreases for the embodiment samples Emb-3 through Emb-9 using the nitrogen gas concentrations of 8 volume % or greater, when compared to that of the comparison sample Cmp. The lower the squareness ratio in the in-plane direction, the more the c-axis of the recording layer is inclined with respect to the substrate surface. Hence, it may be seen that the c-axes 24CA of the CoCrPt recording layers 24 for the embodiment samples Emb-3 through Emb-9 using the nitrogen gas concentrations of 8 volume % or greater, and particularly for the embodiment samples Emb-4 through Emb-9 using the nitrogen gas concentrations of 12 volume % or greater, are inclined with respect to the substrate surface.

An average output at a linear recording density of 90 kfci increases with respect to that of the comparison sample Cmp, for the embodiment samples Emb-2 through Emb-9 using the nitrogen gas concentrations of 5 volume % or greater. In addition, the average output at the linear recording density of 700 kfci increases with respect to that of the comparison sample Cmp, for the embodiment samples Emb-4 through Emb-9 using the nitrogen gas concentrations of 12 volume % or greater.

The S/N ratio is satisfactory for the embodiment samples Emb-1 through Emb-9 using the nitrogen gas concentrations of 2 volume % or greater, when compared to that of the comparison sample Cmp. The S/N ratio greatly increases particularly for the embodiment samples Emb-2 through Emb-9 using the nitrogen gas concentrations of 5 volume % or greater. The S/N ratio in this case is a ratio of the average output at 330 kfci to the medium noise.

An overwrite performance is satisfactory for the embodiment samples Emb-1 through Emb-9 using the nitrogen gas concentrations of 5 volume % or greater, when compared to that of the comparison sample Cmp. The overwrite performance greatly increases (or improves) particularly for the embodiment samples Emb-2 through Emb-9 using the nitrogen gas concentrations of 5 volume % or greater.

Therefore, according to the embodiment samples Emb-1 through Emb-9, it may be seen that the change occurs in the direction of the c-axes 24CA of the CoCrPt recording layer 24 for the nitrogen gas concentrations of 2 volume % or greater, when compared to the comparison sample Cmp, and that satisfactory S/N ratio and overwrite performance are obtained compared to those of the comparison sample Cmp. In addition, it was confirmed that the S/N ratio and the overwrite performance notably improve compared to those of the comparison sample Cmp for the embodiment samples Emb-2 through Emb-9 using the nitrogen gas concentration in the range of 5 volume % to 40 volume. %. It was confirmed that, in this range of the nitrogen gas concentration, the c-axes 24CA of the CoCrPt recording layer 24 are structurally and magnetically inclined with respect to the substrate surface due to the Co(10-11) diffraction ray intensity ratio and the coercivity ratio, when compared to those of the comparison sample Cmp.

Each of the characteristics described above were measured in the following manner. The Co(10-11) diffraction ray intensity ratio was measured using the X-ray diffractometer method (θ-2θ scan, X-ray source: Cu). The in-plane coercivity Hc1 and the perpendicular coercivity Hc2 were measured using a Kerr effect measuring apparatus, by setting a maximum applied magnetic field intensity to 12 kOe and sweeping the applied magnetic field in the direction parallel to (in-plane direction) or perpendicular to (perpendicular direction) the substrate surface. The squareness ratio in the in-plane direction was measured using a SQUID magnetometer, by setting a maximum applied magnetic field intensity to 30 kOe and sweeping the applied magnetic field in the direction parallel to (in-plane direction) the substrate surface. The average output, the S/N ratio and the overwrite performance were measured using a commercial spin stand and a composite head that is made up of an inductive recording element employing the in-plane magnetic recording technique and a GMR element.

The nitrogen gas concentration was set to 40 volume % or less in the embodiment samples Emb-1 through Emb-9 described above. However, from the characteristics shown in FIG. 6, it may easily be expected that satisfactory characteristics will be obtained for the magnetic disks made using the nitrogen gas concentrations exceeding 40 volume %.

Embodiment Sample Emb-10

An embodiment sample Emb-10 according to the first embodiment was made similarly to the embodiment sample Emb-6 described above, except that the composition of the CoCrPt recording layer 24 of the embodiment sample Emb-10 has a larger Pt content than that of the embodiment sample Emb-6, and that the CoCrPt recording layer 24 of the embodiment sample Emb-10 has a thickness of 17 nm. Characteristics of the magnetic disk according to the embodiment sample Emb-10 were measured similarly to those of the embodiment samples Emb-1 through Emb-9.

Figure 7:
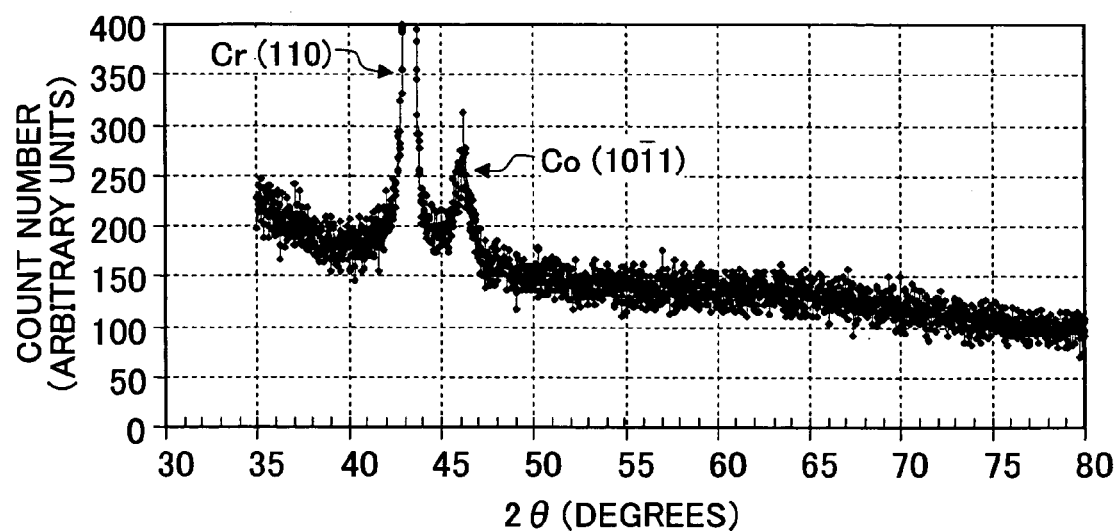
FIG. 7 is a diagram showing an X-ray diffraction pattern of an embodiment sample-10 according to the first embodiment.

FIG. 7 is a diagram showing an X-ray diffraction pattern of the embodiment sample-10 according to the first embodiment. In the case of the magnetic disk according to the embodiment sample Emb-10, only the diffraction rays corresponding to the Co(10-11) crystal face and the Cr(110) crystal face are observed in the X-ray diffraction pattern that is obtained by the θ-2θ scan, as shown in FIG. 7. Hence, as described above in conjunction with the operating principle of the present invention, it may be seen that the (10-11) crystal face of the CoCrPt recording layer 24 is grown on the (110) crystal face of the Cr underlayer 23. Accordingly, it may be seen that the c-axes 24CA of the CoCrPt recording layer 24 are inclined by an inclination angle of approximately 28 degrees with respect to the substrate surface.

Figure 8:
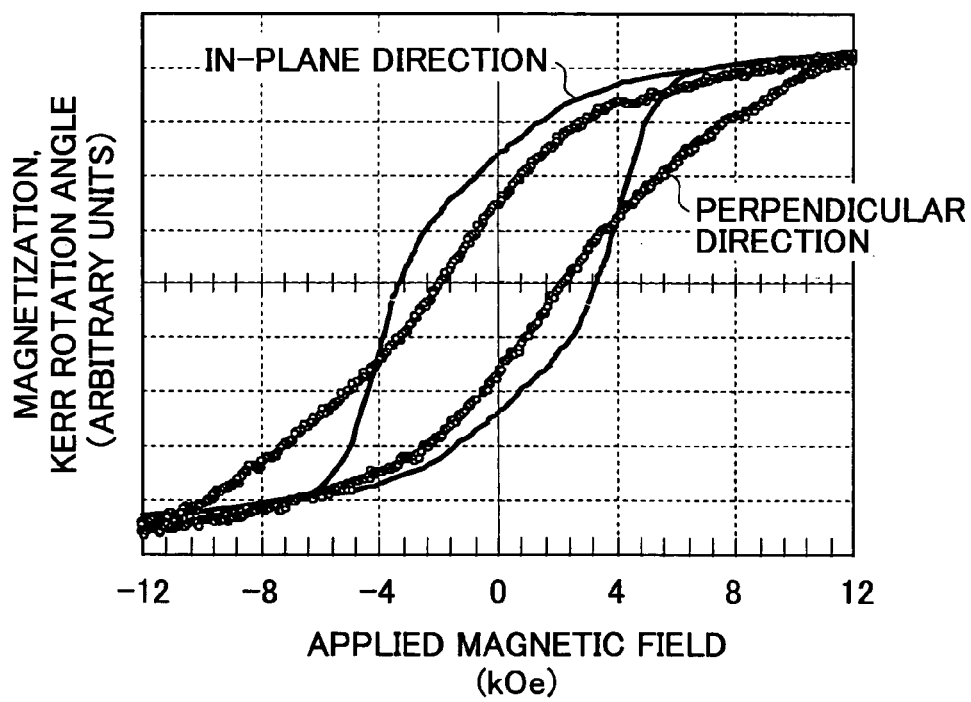
FIG. 8 is a diagram showing a relationship of a magnetization curve and a Kerr rotation angle with respect to an applied magnetic field for the embodiment sample-10.

FIG. 8 is a diagram showing a relationship of a magnetization curve and a Kerr rotation angle with respect to an applied magnetic field for the embodiment sample-10. For the embodiment sample Emb-10, the in-plane coercivity Hc1 measured by the SQUID magnetometer is 3360 Oe, and the perpendicular coercivity Hc2 measured by the Kerr effect measuring apparatus is 2120 Oe, as shown in FIG. 8. Hence, it may be seen from these measurements that the c-axes 24CA of the CoCrPt layer 24 of the embodiment sample Emb-10 are inclined with respect to the substrate surface.

Figure 9:
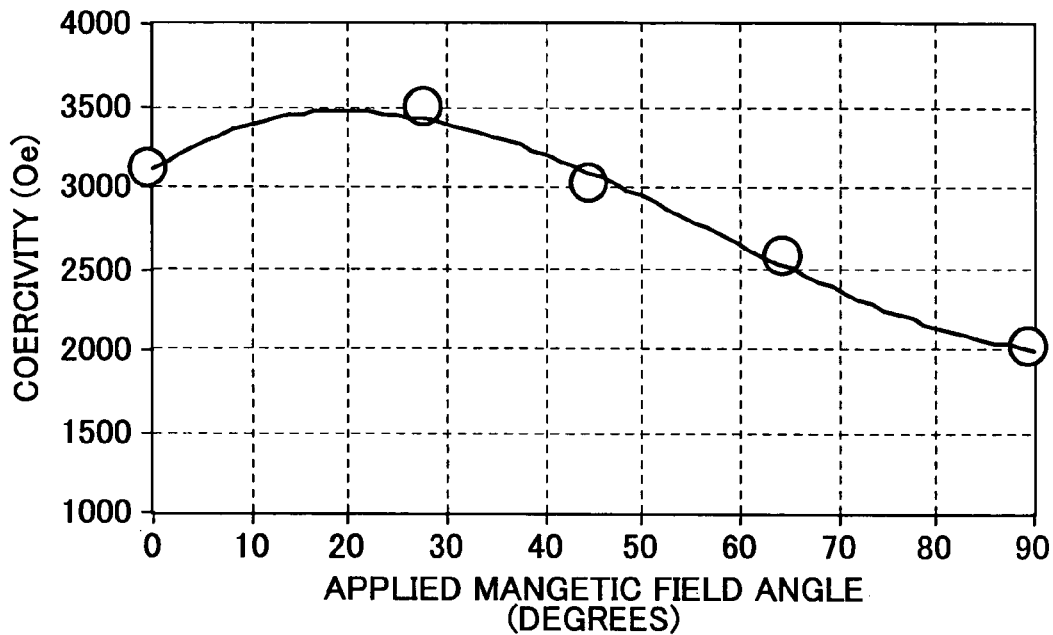
FIG. 9 is a diagram showing a relationship between the coercivity and an applied magnetic field angle with respect to the surface of the sample for the embodiment sample-10.

FIG. 9 is a diagram showing a relationship between the coercivity and an applied magnetic field angle with respect to the surface of the sample for the embodiment sample-10. In FIG. 9, the ordinate indicates an angle (applied magnetic field angle) θ formed by the substrate surface and the direction of the applied magnetic field, and the abscissa indicates the coercivity that is obtained from the magnetization curve by setting the applied magnetic field to the applied magnetic field angle θ. The magnetization curve was measured by a vibrating sample magnetometer (VSM).

As shown in FIG. 9, the coercivity becomes a maximum at the applied magnetic field angle θ of approximately 20 degrees.

Therefore, according to the embodiment sample Emb-10, it was confirmed that, by depositing the CrTi orientation control layer 22 in an atmosphere including an oxygen gas concentration, the c-axes 24CA of the CoCrPt recording layer 24 become inclined with respect to the substrate surface.

Embodiment Sample Emb-11

A magnetic disk according to an embodiment sample Emb-11 was made by forming the orientation control layer 22 within the atmosphere including oxygen gas. The following structure was used for the embodiment sample Emb-11.

Substrate 21: Glass substrate with diameter of 65 mm;
Orientation Control Layer 22: CrTi layer including oxygen with a thickness of 20 nm;
Underlayer 23: CrMo layer with a thickness of 80 nm;
Intermediate Layer: CoCrTa layer with a thickness of 1 nm;
Recording Layer 24: CoCrPt layer with a thickness of 20 nm;
Protection Layer 28: Carbon layer with a thickness of 4.5 nm; and
Lubricant Layer 29: Perfluoropolyether layer with a thickness of 1.5 nm.

The layers of the embodiment sample Emb-11 were formed under the same conditions as the embodiment samples Emb-1 through Emb-9 described above, except for the CrTi orientation control layer 22 and the CoCrTa intermediate layer. For the embodiment sample Emb-11, the CrTi orientation control layer 22 was formed by depositing CrTi within an atmosphere including oxygen gas and Ar gas at a pressure of 0.67 Pa using a DC magnetron sputtering apparatus. The oxygen gas concentration within the atmosphere was set to 10 volume %. In addition, the CoCrTa intermediate layer was formed by depositing CoCrTa in an Ar gas atmosphere at a pressure of 0.67 Pa using the DC magnetron sputtering apparatus.

The X-ray diffraction pattern of the magnetic disk according to the embodiment sample Emb-11 that was made in the above described manner was obtained using the X-ray diffractometer method (θ-2θ scan). As a result, only the diffraction rays corresponding to the Co(10-11) crystal face and the Cr(110) crystal face were observed. Hence, it was confirmed that, by depositing the CrTi orientation control layer 22 in the atmosphere including the oxygen gas, the c-axes 24CA of the CoCrPt recording layer 24 become inclined with respect to the substrate surface.

The relationship of the Kerr rotation angle and the applied field was obtained for the magnetic disk according to the embodiment sample Emb-11. As a result, it was found that the in-plane coercivity Hc1 is 1020 Oe, the perpendicular coercivity. Hc2 is 2380 Oe, and the coercivity ratio Hc2/Hc1 is 0.43. Hence, it was also confirmed from these measurements that the c-axes 24CA of the CoCrPt layer 24 of the embodiment sample Emb-11 are inclined with respect to the substrate surface.

Therefore, according to the embodiment sample Emb-11, the c-axes 24CA of the CoCrPt recording layer 24 can be inclined with respect to the substrate surface, by forming the CrTi orientation control layer 22 by depositing CrTi in the atmosphere including the oxygen gas.

Second Embodiment

Figure 10:
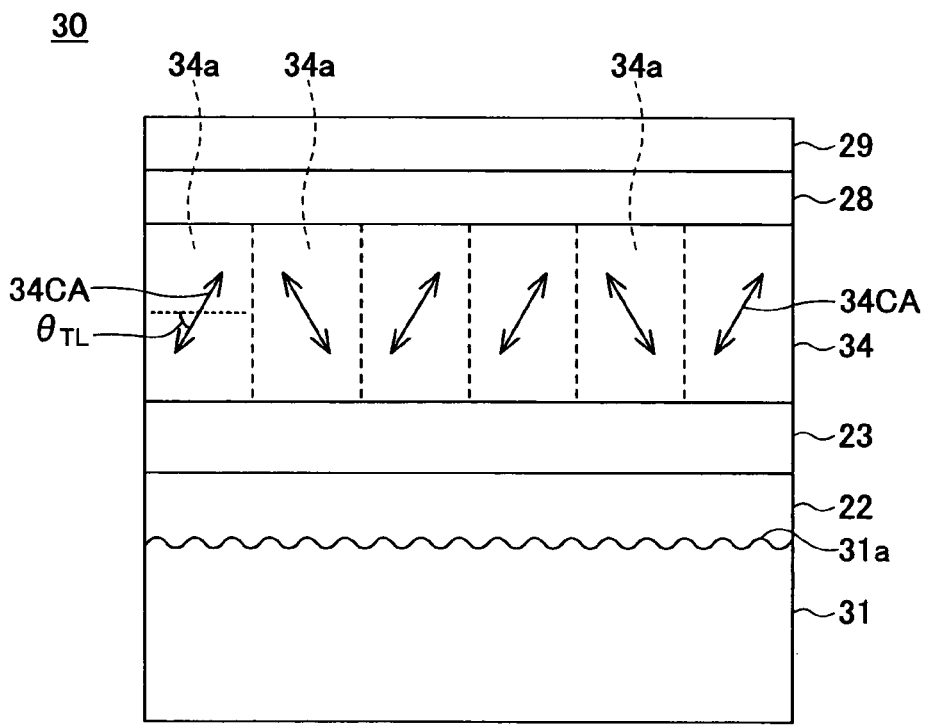
FIG. 10 is a cross sectional view showing a second embodiment of the magnetic recording medium according to the present invention.

FIG. 10 is a cross sectional view showing a second embodiment of the magnetic recording medium according to the present invention. In FIG. 10, those parts which are the same as those corresponding parts in FIG. 4 are designated by the same reference numerals, and a description thereof will be omitted.

A magnetic recording medium 30 shown in FIG. 10 includes a substrate 31, and an orientation control layer 22, an underlayer 23, a recording layer 34, a protection layer 28 and a lubricant layer 29 that are successively formed on the substrate 31. The substrate 31 has a textured surface 31a that is formed by texturing the surface of the substrate 31 in a predetermined direction. Other than the substrate 31 that has the textured surface 31a, the magnetic recording medium 30 has a structure that is basically the same as that of the magnetic recording medium 20 shown in FIG. 4. The recording layer 34 is formed similarly to the recording layer 24 shown in FIG. 4.

The substrate 31 is made of a material similar to that used for the substrate 21, and the surface of the substrate 31 is textured in the predetermined direction to form the textured surface 31a. The textured surface 31a is textured in the recording direction of the magnetic head, for example. The textured surface 31a is formed by a plurality of concave portions that extend in the predetermined direction or, convex portions that extend in the predetermined direction or, concavo-convex portions that extend in the predetermined direction. In the case where the magnetic recording medium 30 has a disk shape, that is, in the case of a magnetic disk, the textured surface 31a is textured in the circumferential direction of the disk shape.

For example, the surface of the substrate 31 may be subjected to a mechanical texturing to form the textured surface 31a. The mechanical texturing may be made by using of a slurry including a polishing agent of fine particles, and polishing the surface of the substrate 31 by the polishing agent so that the textured surface 31a is formed by a plurality of polishing marks made by the fine particles of the polishing agent.

By providing the textured surface 31a, the in-plane direction of c-axes 34CA of the recording layer 34 are expected to become oriented in a predetermined direction, without changing the inclination angle $\theta_{TL}$ of the c-axes 34CA of crystal grains 34a forming the recording layer 34. For example, the predetermined direction may be parallel to or perpendicular to the direction in which the texturing of the textured surface 31a extends. In the case where the magnetic recording medium 30 has the disk shape, the predetermined direction is the circumferential direction or the radial direction of the disk shape (magnetic disk). By orienting the in-plane direction of the c-axes 34CA of the crystal grains 34a forming the recording layer 34 in the predetermine direction, it is possible to improve the reproduced output that can be obtained when reproducing information from the magnetic recording medium 30, for example.

According to the magnetic recording medium 30 of this second embodiment, it is possible to obtain effects similar to those obtainable by the magnetic recording medium 20 of the first embodiment. Further, since the substrate 31 of the magnetic recording medium 30 is provided with the textured surface 31a, the in-plane direction of the c-axes 34CA of the crystal grains 34a forming the recording layer 34 are expected to become oriented in the predetermined direction, without changing the inclination angle $\theta_{TL}$ of the c-axes 34CA of crystal grains 34a forming the recording layer 34.

Although illustration thereof is omitted in FIG. 10, a seed layer made of amorphous NiP, for example, may be provided between the substrate 31 and the orientation control layer 22, and the texturing may be made on the surface of this seed layer instead of on the surface of the substrate 31.

Embodiment Sample Emb-12

A magnetic disk according to an embodiment sample Emb-12 of this second embodiment was made similarly to the embodiment sample Emb-6 described above, except that the surface of the glass substrate 31 was mechanically textured. The mechanical texturing was made in the circumferential direction of the magnetic disk. An average surface roughness of the mechanically textured substrate surface was 0.5 nm when measured by an atomic microscope.

Figure 11:
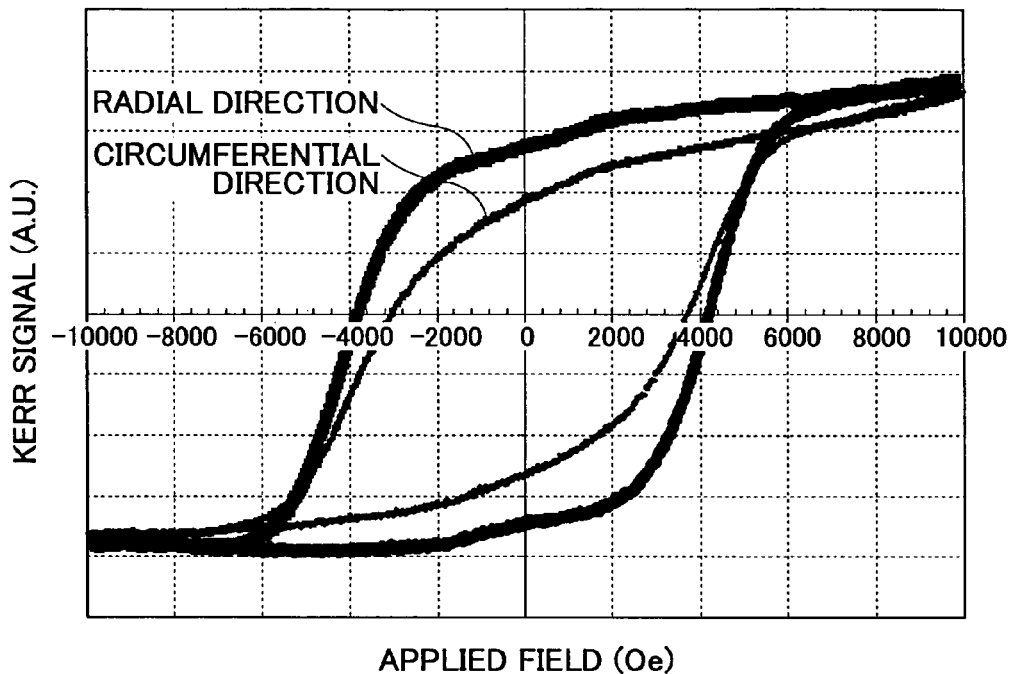
FIG. 11 is a diagram showing a relationship between the Kerr signal and the applied magnetic field for an embodiment sample-12 according to the second embodiment.

FIG. 11 is a diagram showing a relationship between the Kerr signal (arbitrary units) and the applied magnetic field for the embodiment sample-12 according to the second embodiment. Of the two hysteresis curves shown in FIG. 11, one was measured when the applied magnetic field was applied in the radial direction of the magnetic disk, and the other was measured when the applied magnetic field was applied in the circumferential direction.

As shown in FIG. 11, the hysteresis curve in the radial direction had a larger coercivity than the hysteresis curve in the circumferential direction. A ratio of the coercivities in the radial direction and the circumferential direction (=[radial direction coercivity]/[circumferential direction coercivity]) was approximately 1.28. Hence, it may be regarded that the c-axes 34CA of the crystal grains 34a of the recording layer 34 are oriented more in the radial direction than in the circumferential direction. Therefore, according to the embodiment sample Emb-12, the mechanical textured surface 31a of the substrate 31 is expected to make the orientation of the in-plane direction of the c-axes 34CA of the crystal grains 34a forming the recording layer 34 controllable.

Third Embodiment

Figure 12:
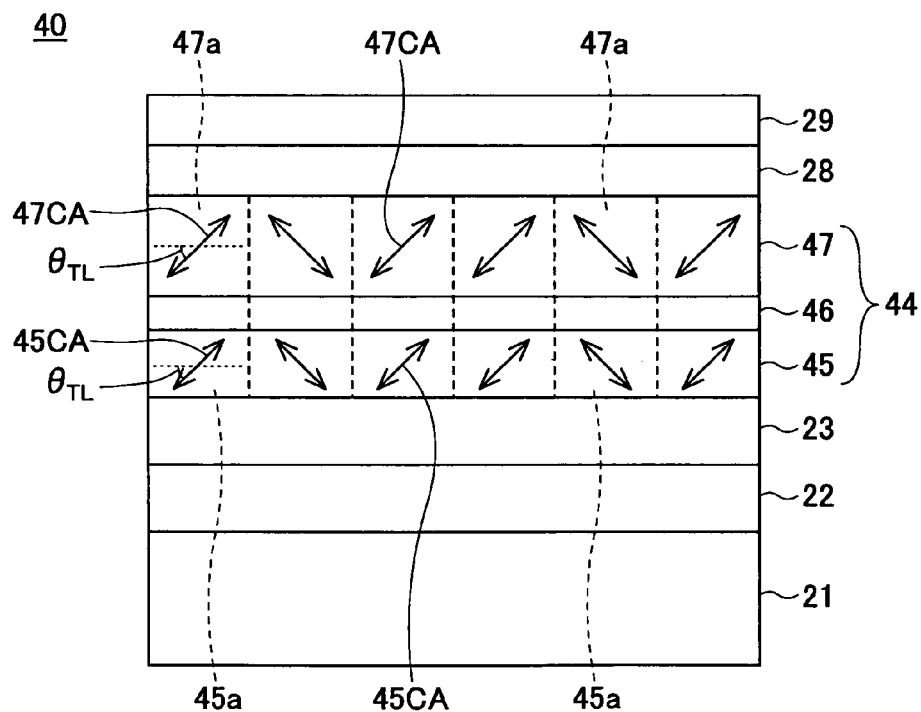
FIG. 12 is a cross sectional view showing a third embodiment of the magnetic recording medium according to the present invention.

FIG. 12 is a cross sectional view showing a third embodiment of the magnetic recording medium according to the present invention. In FIG. 12, those parts which are the same as those corresponding parts in FIG. 4 are designated by the same reference numerals, and a description thereof will be omitted.

A magnetic recording medium 40 shown in FIG. 12 includes a substrate 21, and an orientation control layer 22, an underlayer 23, a recording layer 44, a protection layer 28 and a lubricant layer 29 that are successively formed on the substrate 21. The recording layer 44 includes a first magnetic layer 45, a non-magnetic coupling layer 46 and a second magnetic layer 47 that are successively stacked on the underlayer 23. The first and second magnetic layers 45 and 47 are anti-ferromagnetically exchange-coupled via the non-magnetic coupling layer 46 to form an exchange-coupled structure. In a state where no external magnetic field is applied to the recording layer 44 (or magnetic recording medium 40), the magnetizations of the first magnetic layer 45 and the magnetizations of the second magnetic layer 47 are mutually antiparallel. The magnetic recording medium 40 is formed similarly to the magnetic recording medium 20 shown in FIG. 4, except for the recording layer 44 having the exchange-coupled structure.

The first magnetic layer 45 has a thickness in a range of 0.5 nm to 20 nm, and is made of a ferromagnetic material having an hcp crystal structure and including Co as a main component such that the Co content is greater than 50 at. %. The first magnetic layer 45 may be made of a material similar to that used for the recording layer 24 of the magnetic recording medium 20 shown in FIG. 4.

For example, the non-magnetic coupling layer 46 is made of a material selected from a group consisting of Ru, Rh, Ir, Ru alloys, Rh alloys and Ir alloys. In a case where the first and second magnetic layers 45 and 47 are made of a CoCrPt alloy, it is preferable to use Ru or an Ru alloy for the non-magnetic coupling layer 46 in that a satisfactory lattice matching may be achieved. The Ru alloy may include in addition to Ru, at least one element or alloy selected from a group consisting of Cr, Cr, Fe, Ni, Mn and alloys thereof (that is, alloys including at least one of such elements).

The non-magnetic coupling layer 46 has a thickness in a range of 0.4 nm to 1.5 nm, and preferably in a range of 0.6 nm to 0.9 nm. By setting the thickness of the non-magnetic coupling layer 46 within such a range, the magnetizations of the first magnetic layers 45 and the magnetizations of the second magnetic layer 47 become anti-ferromagnetically exchange-coupled.

The second magnetic layer 47 has a thickness in a range of 5 nm to 20 nm, and is made of a material similar to that of the first magnetic layer 45. If a remanent magnetization and the thickness of the first magnetic layer 45 are respectively denoted by Mr1 and t1, and a remanent magnetization and the thickness of the second magnetic layer 47 are respectively denoted by Mr2 and t2, it is preferable that the first and second magnetic layers 45 and 47 satisfy a relationship (Mr1×t1)< (Mr2×t2). Since the magnetization direction of the second magnetic layer 47 becomes the same as the effective or net magnetization direction of the first and second magnetic layers 45 and 47, a magnetization region is formed at a position corresponding to a reversal position of the recording magnetic field of the magnetic head. As a result, it is possible to form bits at positions having a small error with respect to the reversal positions of the recording magnetic field.

The material forming the second magnetic layer 47 may have a composition different from that of the material forming the first magnetic layer 45. For example, the material or the composition ratio of the material forming the second magnetic layer 47 may be different from that of the first magnetic layer 45. The material forming the second magnetic layer 47 may be a ferromagnetic material having a larger anisotropic magnetic field than the material forming the first magnetic layer 45. Such a ferromagnetic material may be selected for the second magnetic layer 47 by adding no Pt to the material forming the first magnetic layer 45 but adding Pt to the material forming the second magnetic layer 47. Alternatively the Pt content (or atomic concentration of Pt) may be set higher for the second magnetic layer 47 than for the first magnetic layer 45. In the case where the first magnetic layer 45 is made of CoCr or a CoCr alloy, the second magnetic layer 47 may be made of CoCrPt or a CoCrPt alloy. In addition, in the case where the first magnetic layer 45 is made of $CoCrPt_8$, the second magnetic layer 47 may be made of $CoCrPt_{12}$, where the numerals denote atomic concentration.

Similarly as in the case of the recording layer 24 of the first embodiment shown in FIG. 4, c-axes 45CA and 47CA of crystal grains 45 and 47a of the first and second magnetic layers 45 and 47 are inclined by an inclination angle $\theta_{TL}$ with respect to the substrate surface. In other words, the (10-11) crystal face of the first magnetic layer 45 is epitaxially grown, in a lattice matched manner, on the (110) crystal face of the underlayer 23. Furthermore, the crystal grains 47a of the second magnetic layer 47 are grown via the non-magnetic coupling layer 46 so that the (10-11) crystal face of the second magnetic layer 47 is parallel to the substrate surface.

The first magnetic layer 45, the non-magnetic coupling layer 46 and the second magnetic layer 47 may be formed similarly to the recording layer 24 of the first embodiment. The substrate 21 may of course be reheated to approximately 200° C. prior to forming the first magnetic layer 45 or the non-magnetic coupling layer 46.

Figure 13:
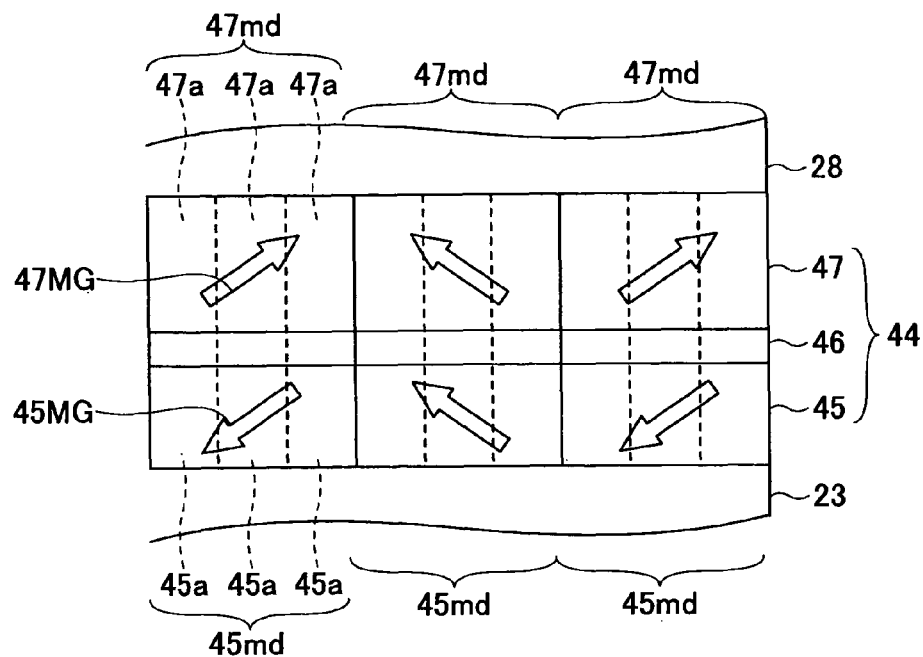
FIG. 13 is a diagram schematically showing the state of the recording layer of the third embodiment of the magnetic recording medium after the recording.

FIG. 13 is a diagram schematically showing the state of the recording layer of the third embodiment of the magnetic recording medium after the recording. FIG. 13 shows a cross section taken along the recording direction of the magnetic recording medium 40.

Referring to FIGS. 13 and 12, when a recording operation is carried out, a recording magnetic field H which alternatively reverses direction along the in-plane direction is applied to the recording layer 44 by a recording head (not shown) employing the in-plane magnetic recording technique, to thereby form a plurality of magnetization regions 45md in the first magnetic layer 45 and a plurality of magnetization regions 47md in the second magnetic layer 47. Each magnetization region 45md is made up of a plurality of crystal grains 45a, and each magnetization region 47md is made up of a plurality of crystal grains 47a. A remanent magnetization 47MG is formed in the magnetization region 47md of the second magnetic layer 47, in a direction indicated by an arrow. It may be regarded that the directions of the remanent magnetizations 47MG of the magnetization regions 47md alternately become upwardly inclined towards the right and upwardly inclined towards the left.

On the other hand, a remanent magnetization 45MG is formed in the magnetization region 45md of the first magnetic layer 45, in a direction indicated by an arrow and antiparallel with respect to the remanent magnetization 47MG of the second magnetic layer 47. In other words, the remanent magnetization 45MG is parallel to the remanent magnetization 47MG, but the direction of the remanent magnetization 45MG is opposite to that of the remanent magnetization 47MG, because of the anti-ferromagnetic exchange coupling described above between the remanent magnetization 45MG and the remanent magnetization 47MG.

Since the remanent magnetization 45MG and the remanent magnetization 47MG are anti-ferromagnetically exchange-coupled, the magnetization region 45md and the magnetization region 47md essentially form a single magnetization region. Accordingly, the volume of the magnetization regions 45md and 47md increases, and the thermal stability of the remanent magnetizations 45MG and 47MG of the magnetic recording medium 40, that is, the thermal stability of the recorded magnetization, further improves compared to that of the magnetic recording medium 20 of the first embodiment.

When newly recording information on the recording layer 44 including the first and second magnetic layers 45 and 47 having the remanent magnetizations 45MG and 47MG described above, the recording magnetic field H is applied in a direction approximately along the in-plane direction. Since the direction of the recording magnetic field and the directions of the remanent magnetizations 45MG and 47MG form an inclination angle approximately similar to the inclination angle $\theta_{TL}$ of the c-axes 45CA and 47CA shown in FIG. 12, the remanent magnetizations 45MG and 47MG can be reversed by the recording magnetic field intensity $H_0$ that is considerably smaller than the anisotropic magnetic fields of the first and second magnetic layers 45 and 47, as may be readily understood from the description given above in conjunction with FIG. 3B.

As described above, the magnetic recording medium 40 of this third embodiment can obtain effects similar to those obtainable by the magnetic recording medium 20 of the first embodiment. In addition, because the magnetizations of the first and second magnetic layers 45 and 47 are anti-ferromagnetically exchange-coupled, it is possible to further improve the thermal stability of the recorded magnetization. Moreover, it is possible to further improve the S/N ratio, since the magnetic recording medium 40 of this third embodiment can improve the thermal stability of the recorded magnetization while reducing the grain size (or grain diameter) of the crystal grains 45a and 47a forming the corresponding first and second magnetic layers.

Fourth Embodiment

A fourth embodiment of the magnetic recording medium according to the present invention is suited for recording by use of a recording head employing the perpendicular magnetic recording technique, that is, by use of a single magnetic pole head.

Figure 14:
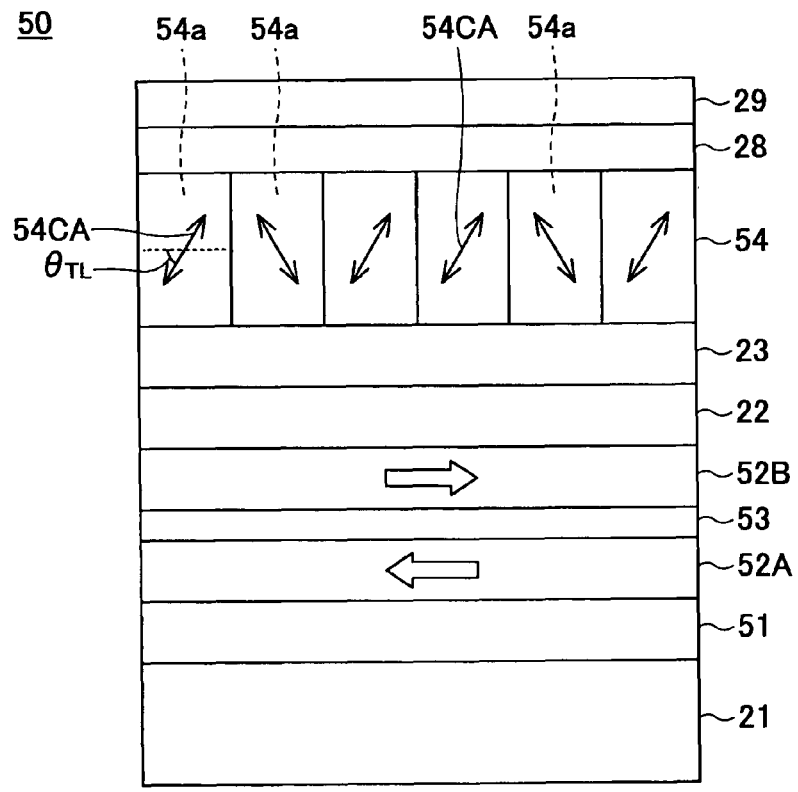
FIG. 14 is a cross sectional view showing a fourth embodiment of the magnetic recording medium according to the present invention.

FIG. 14 is a cross sectional view showing this fourth embodiment of the magnetic recording medium according to the present invention. In FIG. 14, those parts which are the same as those corresponding parts in FIG. 4 are designated by the same reference numerals, and a description thereof will be omitted.

A magnetic recording medium 50 shown in FIG. 14 includes a substrate 21, and a first soft magnetic layer 51, a second soft magnetic layer 52A, a non-magnetic coupling layer 53, a third soft magnetic layer 52B, an orientation control layer 22, an underlayer 23, a recording layer 54, a protection layer 28 and a lubricant layer 29 that are successively formed on the substrate 21. The second soft magnetic layer 52A and the third soft magnetic layer 52B are anti-ferromagnetically exchange-coupled via the non-magnetic coupling layer 53, and form an exchange-coupled structure. In a state where no external magnetic field is applied to the magnetic recording medium 50, the magnetizations of the second soft magnetic layer 52A and the magnetizations of the third soft magnetic layer 52B are mutually antiparallel. The magnetic recording medium 50 is formed similarly to the magnetic recording medium 20 of the first embodiment shown in FIG. 4, except for the first soft magnetic layer 51, the second soft magnetic layer 52A, the non-magnetic coupling layer 53 and the third soft magnetic layer 52B that are additionally provided. In other words, in the recording layer 54, c-axes 54CA of crystal grains 54a forming the recording layer 54 are inclined by a predetermined inclination angle ETL with respect to the substrate surface.

The first soft magnetic layer 51, the second soft magnetic layer 52A and the third soft magnetic layer 52B may be made of an amorphous or microcrystalline soft magnetic material including at least one element selected from a group consisting of Fe, Co, Ni, Al, Si, Ta, Ti, Zr, Hf, V, Nb, C and B. Such a soft magnetic material includes FeSi, FeAlSi, FeTaC, CoNbZr, CoZtTa, CoCrNb, NiFe and NiFeNb.

The first soft magnetic layer 51 has a thickness in a range of 10 nm to 2 μm, for example. The first soft magnetic layer 51 is provided to absorb approximately all of magnetic flux MF from the recording head.

The second soft magnetic layer 52A and the third soft magnetic layer 52B have a thickness in a range of 10 nm to 100 nm, for example. The magnetizations of the second and third soft magnetic layers 52A and 52B are anti-ferromagnetically exchange-coupled via the non-magnetic coupling layer 53. A stacked structure made up of the second soft magnetic layer 52A, the non-magnetic coupling layer 53 and the third soft magnetic layer 52B suppresses spike noise caused by magnetic domain wall motion in the first soft magnetic layer 51.

From the point of view of suppressing the spike noise, the soft magnetic materials used for the second and third soft magnetic layers 52A and 52B preferably has a larger saturation magnetic flux density that the soft magnetic material sued for the first soft magnetic layer 51. For example, when CoNbTa is used for the first soft magnetic layer 51, CoZrTa may be used for the second and third soft magnetic layers 52A and 52B.

The non-magnetic coupling layer 53 may be made of a material similar to that used for the non-magnetic coupling layer 46 in the magnetic recording medium 40 of the third embodiment shown in FIG. 12. The thickness of the non-magnetic coupling layer 53 may also be set similarly to that of the non-magnetic coupling layer 46.

The stacked structure made up of the second soft magnetic layer 52A, the non-magnetic coupling layer 53 and the third soft magnetic layer 52B may be provided to contact the surface of the first soft magnetic layer 51 closer to the substrate 21. This stacked structure may be omitted if the spike noise can be suppressed solely by the first soft magnetic layer 51.

A method of producing the magnetic recording medium 50 may be approximately the same as that used to produce the magnetic recording medium 20 of the first embodiment shown in FIG. 4. The first soft magnetic layer 51, the second soft magnetic layer 52A and the third soft magnetic layer 52B may be formed by electroless plating, electroplating, sputtering, deposition (or evaporation) and the like. The non-magnetic coupling layer 53 may be formed by sputtering since it is a thin film. Since it is preferable to continuously form the second soft magnetic layer 52A, the non-magnetic coupling layer 53 and the third soft magnetic layer 52B, it is preferable to employ the sputtering to form these layers.

Figure 15:
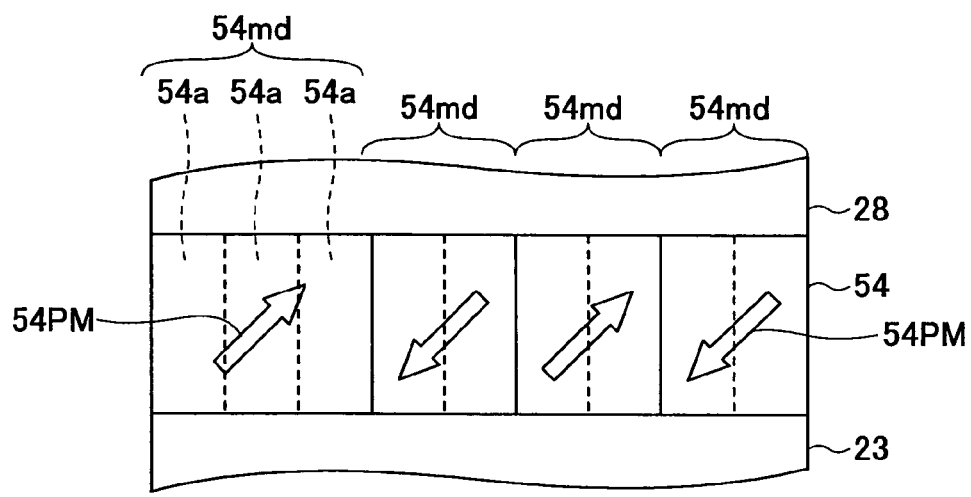
FIG. 15 is a diagram schematically showing the state of the recording layer of the fourth embodiment of the magnetic recording medium after the recording.

FIG. 15 is a diagram schematically showing the state of the recording layer of the fourth embodiment of the magnetic recording medium after the recording.

Referring to FIG. 15 and FIG. 14, a plurality of magnetization regions 54md are formed in the recording layer 54 by a recording magnetic field from a recording head (not shown) employing the perpendicular magnetic recording technique. Each magnetization region 54md includes a plurality of crystal grains 54a. A remanent magnetization 54PM is formed in the magnetization region 54md as indicated by an arrow in FIG. 15. It may be regarded that the directions of the remanent magnetizations 54PM of the magnetization regions 54md alternately become upwardly inclined towards the right and downwardly inclined towards the left. With respect to the substrate surface the remanent magnetizations 54PM form an angle approximately similar to the inclination angle $\theta_{TL}$ of the c-axes 54CA of the recording layer 54 shown in FIG. 14.

In addition, when newly recording information on the recording layer 54, the recording head applies the recording magnetic field in the direction perpendicular with respect to the substrate surface. Hence, the direction of the recording magnetic field becomes inclined with respect to the directions of the remanent magnetizations 54PM. For example, in a case where the direction of the remanent magnetization 54PM forms an angle of 28 degrees with respect to the substrate surface, the angle formed by the direction of the recording magnetic field and the direction of the remanent magnetization 54PM becomes 62 degrees. Since the recording magnetic field is applied in such an inclined direction with respect to the remanent magnetization PM, it is possible to reverse the remanent magnetization 54PM by a recording magnetic field intensity that is considerably smaller than the anisotropic magnetic field of the recording layer 54, as may be readily understood from the description given above in conjunction with FIG. 3B.

Therefore, the magnetic recording medium 50 of this fourth embodiment has the first soft magnetic layer 51, the second soft magnetic layer 52A, the non-magnetic coupling layer 53 and the third soft magnetic layer 52B provided between the substrate 21 and the orientation control layer 22. Hence, the magnetic recording medium 50 is suited for the perpendicular magnetic recording.

In addition, according to the magnetic recording medium 50 of this fourth embodiment, it is possible to cause the c-axes 54CA of the crystal grains 54a forming the recording layer 54 to become inclined with respect to the substrate surface. As a result, the direction of the recording magnetic field becomes inclined with respect to the c-axes 54CA, and the remanent magnetizations 54PM can be reversed by a recording magnetic field intensity that is considerably smaller than the anisotropic magnetic field of the recording layer 54.

Moreover, the magnetic recording medium 50 of this fourth embodiment can reduce the recording magnetic field intensity that is required when carrying out the recording by use of the recording head employing the perpendicular magnetic recording technique, and can secure a satisfactory recording performance. Furthermore, since the magnetic recording medium 50 of this fourth embodiment can increase the anisotropic magnetic field of the recording layer 54, it is possible to increase the thermal stability of the recorded magnetization. The magnetic recording medium 50 of this fourth embodiment can also reduce the grain size (or grain diameter)

of the crystal grains 54a forming the recording layer 54 while maintaining the thermal stability of the recorded magnetization, and as a result, it is possible to improve the S/N ratio.

Fifth Embodiment

A fifth embodiment of the magnetic recording medium according to the present invention is suited for recording by a recording head employing the perpendicular magnetic recording technique, such as a single magnetic pole head.

Figure 16:
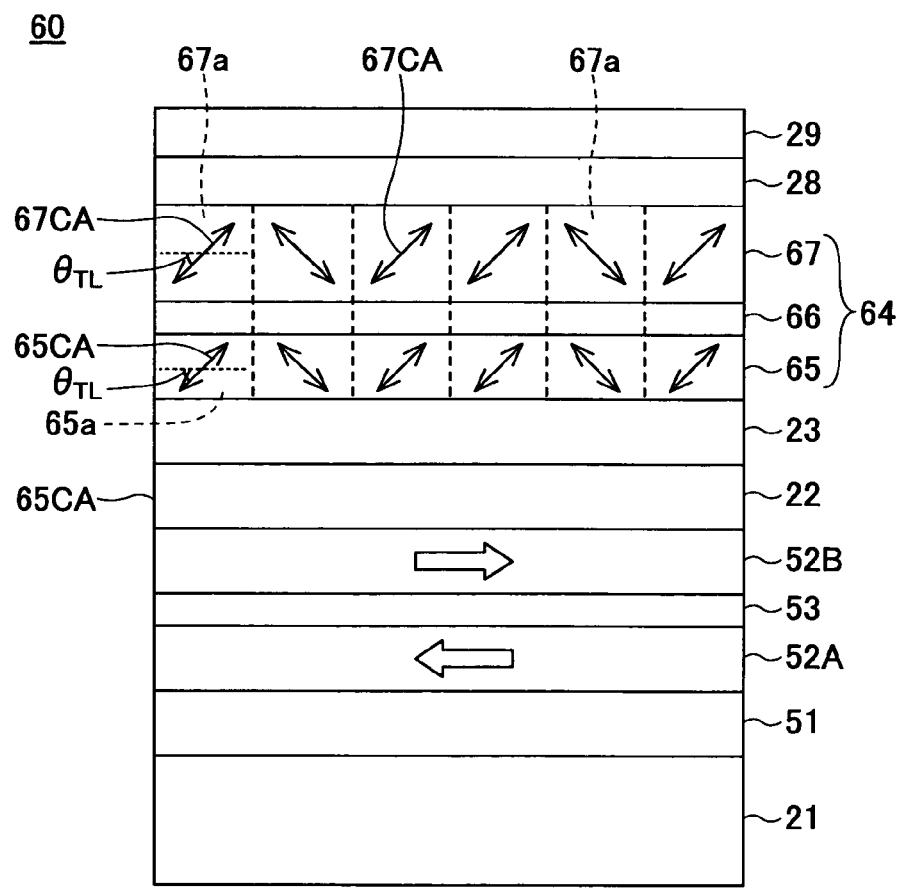
FIG. 16 is a cross sectional view showing a fifth embodiment of the magnetic recording medium according to the present invention.

FIG. 16 is a cross sectional view showing this fifth embodiment of the magnetic recording medium according to the present invention. In FIG. 16, those part which are the same as those corresponding parts in FIGS. 4 and 14 are designated by the same reference numerals, and a description thereof will be omitted.

A magnetic recording medium 60 of this fifth embodiment shown in FIG. 16 includes a substrate 21, and a first soft magnetic layer 51, a second soft magnetic layer 52A, a non-magnetic coupling layer 53, a third soft magnetic layer 52B, an orientation control layer 22, an underlayer 23, a recording layer 64, a protection layer 28 and a lubricant layer 29 that are successively formed on the substrate 21. The recording layer 64 includes a first magnetic layer 65, a non-magnetic coupling layer 66 and a second magnetic layer 67 that are successively stacked on the underlayer 23. The first and second magnetic layers 65 and 67 are anti-ferromagnetically exchange-coupled via the non-magnetic coupling layer 66, to form an exchange-coupled structure. In a state where no external magnetic field is applied to the magnetic recording medium 60, the magnetizations of the first magnetic layer 65 and the magnetizations of the second magnetic layer 67 are mutually antiparallel. In addition, the second soft magnetic layer 52A and the third soft magnetic layer 52B are anti-ferromagnetically exchange-coupled via the non-magnetic coupling layer 53, to form an exchange-coupled structure. In a state where no external magnetic field is applied to the magnetic recording medium 60, the magnetizations of the second soft magnetic layer 52A and the magnetizations of the third soft magnetic layer 52B are mutually antiparallel.

The magnetic recording medium 60 has a structure that is a combination of the structure of the magnetic recording medium 40 of the third embodiment shown in FIG. 12 and the structure of the magnetic recording medium 50 of the fourth embodiment shown in FIG. 14. In other words, the recording layer 64 of the magnetic recording medium 60 has a structure similar to that of the recording layer 44 of the magnetic recording medium 40 shown in FIG. 12. In addition, the first soft magnetic layer 51, the second soft magnetic layer 52A, the non-magnetic coupling layer 53 and the third soft magnetic layer 52B of the magnetic recording medium 60 has a structure similar to the first soft magnetic layer 51, the second soft magnetic layer 52A, the non-magnetic coupling layer 53 and the third soft magnetic layer 52B of the magnetic recording medium 50 shown in FIG. 14. Moreover, the magnetic recording medium 60 may be produced by a method similar to those used to produce the magnetic recording media 40 and 50 of the third and fourth embodiments.

Figure 17:
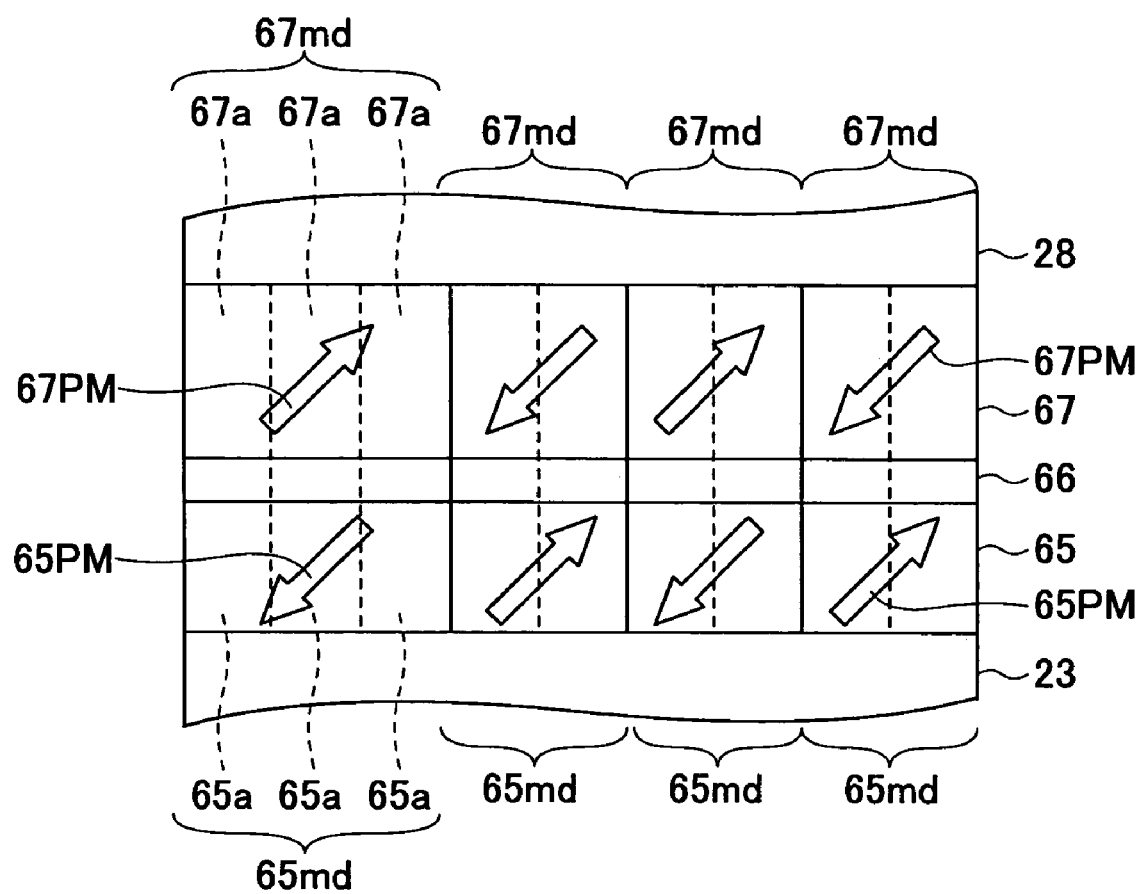
FIG. 17 is a diagram schematically showing the state of the recording layer of the fifth embodiment of the magnetic recording medium after the recording.

FIG. 17 is a diagram schematically showing the state of the recording layer of the fifth embodiment of the magnetic recording medium after the recording.

Referring to FIG. 17 and FIG. 16, a plurality of magnetization regions 65md and 67md are formed in the first and second magnetic layers 65 and 67 by a recording magnetic field from a recording head (not shown) employing the perpendicular magnetic recording technique. Each magnetization region 65md includes a plurality of crystal grains 65a, and each magnetization region 67md includes a plurality of crystal grains 67a. A remanent magnetization 67PM is formed in the magnetization region 67md of the second magnetic layer 67 as indicated by an arrow in FIG. 17. It may be regarded that the directions of the remanent magnetizations 67PM of the magnetization regions 67md alternately become upwardly inclined towards the right and downwardly inclined towards the left.

On the other hand, remanent magnetizations 65PM are formed in the magnetization region 65md of the first magnetic layer 65, in a manner antiparallel with respect to the remanent magnetizations 67PM of the second magnetic layer 67. In other words, the remanent magnetization 65PM is parallel to the remanent magnetization 67PM, and the direction of the remanent magnetization 65PM is opposite to that of the remanent magnetization 67PM, due to the anti-ferromagnetic exchange coupling between the remanent magnetization 65PM and the remanent magnetization 67PM.

Because the remanent magnetization 65PM and the remanent magnetization 67PM are anti-ferromagnetically exchange-coupled, the magnetization region 65md and the magnetization region 67md substantially form a single magnetization region. As a result, the volume of the magnetization region substantially increases, and thermal stability of the remanent magnetizations 65PM and 67PM, that is, the thermal stability of the recorded magnetization, further improves compared to that of the magnetic recording medium 50 of the fourth embodiment.

In addition, when newly recording information on the recording layer 64 having the first and second magnetic layers 65 and 67, a recording magnetic field is applied in a direction inclined with respect to the directions of the remanent magnetizations 65PM and 67PM of the first and second magnetic layers 65 and 67. Hence, the remanent magnetizations 65PM and 67PM can be reversed by a recording magnetic field intensity that is considerably smaller than the anisotropic magnetic fields of the first and second magnetic layers 65 and 67.

Therefore, according to the magnetic recording medium 60 of this fifth embodiment, it is possible to obtain effects that are similar to those obtainable by the magnetic recording medium 50 of the fourth embodiment. In addition, since the magnetizations of the first and second magnetic layers 65 and 67 are anti-ferromagnetically exchange-coupled, it is possible to further improve the thermal stability of the recorded magnetization. Furthermore, the grain size (or grain diameter) of the crystal grains 65a and 67a of the first and second magnetic layers 65 and 67 can further be reduced while improving the thermal stability, and the S/N ratio can further be improved according to the magnetic recording medium 60 of this fifth embodiment.

Sixth Embodiment

A sixth embodiment of the magnetic recording medium according to the present invention includes a first magnetic layer that has an inclined (or oblique) orientation and a second magnetic layer that has a perpendicular orientation.

Figure 18:
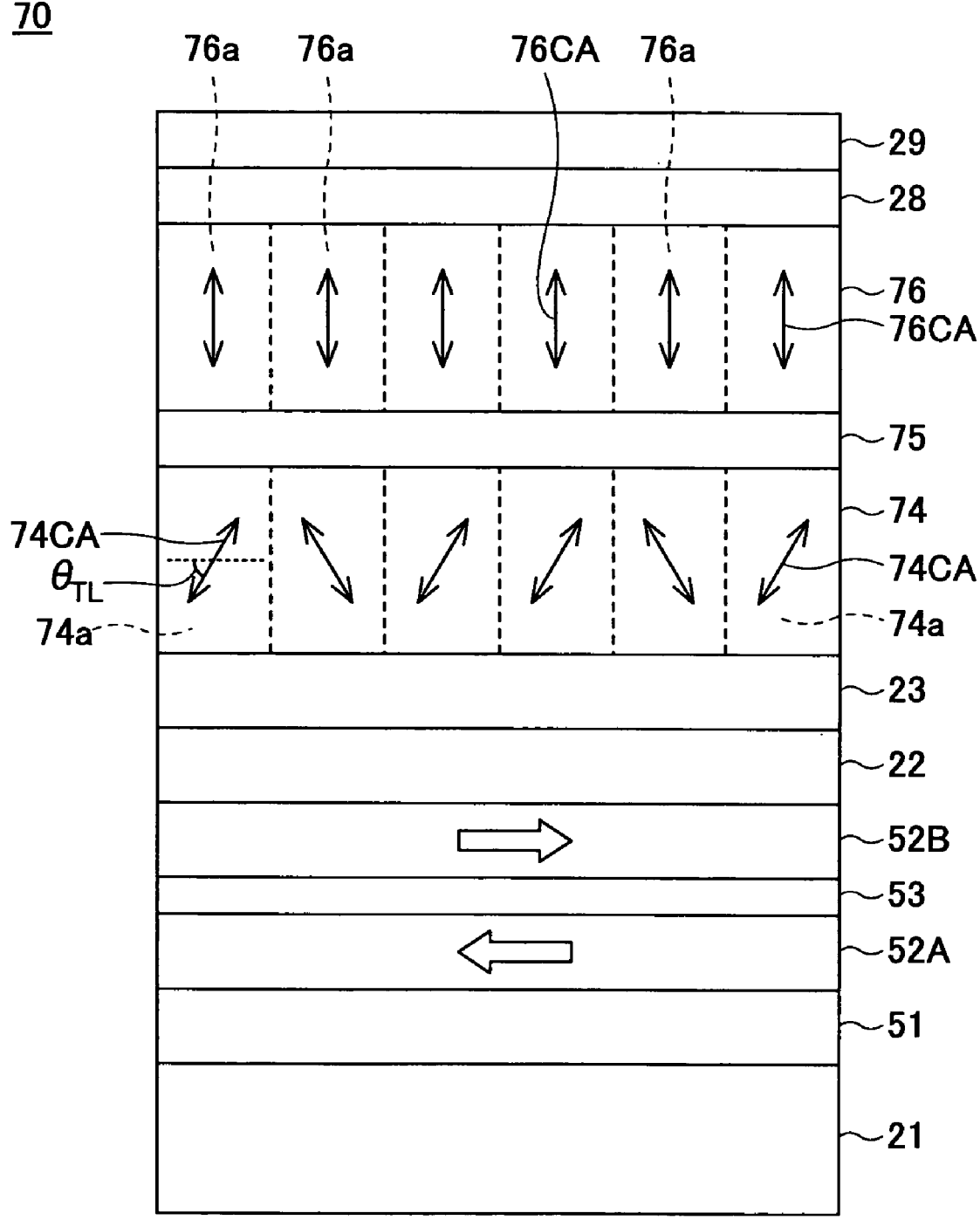
FIG. 18 is a cross sectional view showing a sixth embodiment of the magnetic recording medium according to the present invention.

FIG. 18 is a cross sectional view showing this sixth embodiment of the magnetic recording medium according to the present invention. In FIG. 18, those parts that are the same as those corresponding parts of the embodiments described above are designated by the same reference numerals, and a description thereof will be omitted.

A magnetic recording medium 70 of this embodiment includes a substrate 21, and a first soft magnetic layer 51, a second soft magnetic layer 52A, a non-magnetic coupling layer 53, a third soft magnetic layer 52B, an orientation control layer 22, an underlayer 23, a first magnetic layer 74, an intermediate layer 75, a second magnetic layer 76, a protection layer 28, and a lubricant layer 29 that are successively formed on the substrate 21 as shown in FIG. 18.

The first magnetic layer 74 is made of a material similar to that forming the recording layer 24 of the first embodiment shown in FIG. 4. In other words, the first magnetic layer 74 is made of a ferromagnetic material having a hcp crystal structure and including Co as the main component, and has a thickness in a range of 5 nm to 30 nm, and preferably in a range of 5 nm to 20 nm, for example. The Co content of the first magnetic layer 74 is greater than 50 at. %, and is selected from a group consisting of CoCr, CoCr alloys, CoPt, CoCrPt, CoCrTa and CoCrPt alloys, for example. The CoCrPt alloys include CoCrPt-M, where an added element M is selected from a group consisting of B, Mo, Nb, Ta, W, Cu and alloys thereof. For example, the CoCrPt-M is preferable from the point of view that it is possible to control the grain diameter of crystal grains 74a of the first magnetic layer 74. From the point of view that a large anisotropic magnetic field can be obtained, it is preferable to use CoCrPt or CoCrPt alloys for the first magnetic layer 74.

The first magnetic layer 74 is formed by the polycrystalline substance of crystal grains 74a made of the material described above. The crystal grains 74a grow epitaxially on the surface of the underlayer 23, and are formed in the direction approximately perpendicular to the substrate surface. In other words, the (110) crystal face appears at the surface of the underlayer 23 due to the effects of the orientation control layer 22. The crystal grains 74a of the first magnetic layer 74 grow on the (110) crystal face of the underlayer 23 such that the (10-11) crystal face of the crystal grains 74a is lattice matched to the (110) crystal face of the underlayer 23. Accordingly, the (10-11) crystal face of the crystal grains 74a becomes parallel to the substrate surface. C-axes 74CA of the crystal grains 74a are inclined by approximately 28 degrees with respect to the (10-11) crystal face. Hence, the c-axes 74CA of the crystal grains 74a have an inclination angle $\theta_{TL}$ of approximately 28 degrees with respect to the substrate surface. When all of the crystal grains 74a assume such an inclined state, it may be regarded, by taking into consideration the distribution of the directions of the c-axes 74CA, that the c-axes 74CA become inclined in a range of 28 degrees±2 degrees with respect to the substrate surface.

In addition, the first magnetic layer 74 may have the so-called granular structure made up of a ferromagnetic material having Co as the main component and having the hcp crystal structure and a non-magnetic material. The ferromagnetic material forming the granular structure may be a Co alloy selected from a group consisting of CoPt, CoCrTa, CoCrPt and CoCrPt-M, where an added element M is selected from a group consisting of B, Mo, Nb, Ta, W, Cu and alloys thereof. In addition, the non-magnetic material forming the granular structure may be a compound of one element selected from a group consisting of Si, Al, Ta, Zr, Y, Ti and Mg and one element selected from a group consisting of O, N and C. For example, the non-magnetic material may be oxides such as $SiO_2$, $Al_2O_3$, $Ta_2O_5$, $ZrO_2$, $Y_2O_3$, $TiO_2$ and MgO or, nitrides such as $Si_3N_4$, AlN, TaN, ZrN, TiN and $Mg_3N_2$ or, carbides such as SiC, TaC, ZrC and TiC.

In the first magnetic layer 74 made of the Co alloy described above having the granular structure, a large number of crystal grains extend in the perpendicular direction with respect to the substrate surface, and the non-magnetic material surrounds each crystal grain and physically isolates the adjacent crystal grains by forming the non-solid phase (not shown). The crystal grains have the same c-axis orientation as the crystal grains 74a described above. In other words, the c-axes of the crystal grains of the first magnetic layer 74 become inclined with respect to the substrate surface via the underlayer 23 due to the effects of the orientation control layer 23. It may be regarded that the c-axis orientation becomes inclined in a range of 28 degrees±2 degrees with respect to the substrate surface. The magnetic interaction of the first magnetic layer 74 is reduced because the adjacent crystal grains are physically isolated by the non-solid phase of the non-magnetic material, and as a result, it is possible to reduce the medium noise.

The intermediate layer 75 may be made of a material selected from any suitable transition metals or alloys thereof that orient c-axes 76CA of crystal grains 76a of the second magnetic layer 76 perpendicular with respect to the substrate surface. For example, the intermediate layer 75 is made of a material including at least one kind of element selected from a group consisting of Mo, Nb, V, W, Cr, Al, Cu, Pt, Ru and Re. The intermediate layer 75 has a thickness in a range of 5 nm or less, and preferably 2 nm or less. As will be described later, the first magnetic layer 74 and the second magnetic layer 76 become ferromagnetically coupled by using such an intermediate layer 75. From the point of view that a sufficient ferromagnetic coupling is obtained, the thickness of the intermediate layer 75 is preferably 0.2 nm or greater and 2 nm or less.

The second magnetic layer 76 is made of a material similar to that forming the first magnetic layer 74. In other words, the second magnetic layer 76 may be made of a ferromagnetic material having Co as the main component and having the hcp crystal structure or, may have the granular structure made up of the ferromagnetic material and the non-magnetic material. For example, the second magnetic layer 76 has a thickness in a range of 5 nm to 30 nm, and preferably in a range of 5 nm to 20 nm.

In the case where the second magnetic layer 76 is made of the ferromagnetic material having Co as the main component and having the hcp crystal structure, the second magnetic layer 76 is formed by the polycrystalline substance of crystal grains 76a made of the material described above. The crystal grains 76a grow on the surface of the intermediate layer 75, and are formed in the direction approximately perpendicular to the substrate surface. C-axes 76CA of the crystal grains 76a are approximately perpendicular with respect to the substrate surface.

In the case where the second magnetic layer 76 has the granular structure made up of the ferromagnetic material and the non-magnetic material, the crystal grains 76a grow on the surface of the intermediate layer 75, and are formed in the direction approximately perpendicular to the substrate surface. In addition, the c-axes 76CA of the crystal grains 76a are approximately perpendicular with respect to the substrate surface due to the effects of the intermediate layer 75.

The combination of the materials used for the first and second magnetic layers 74 and 76 may be set arbitrarily. If a magnetic layer having Co as the main component and having the hcp crystal structure is referred to as a thin-film metal magnetic layer, and a magnetic layer having the granular structure made up of the ferromagnetic material and the non-magnetic material is referred to as a granular structured magnetic layer, the combination of the first and second magnetic layers 74 and 76 may be formed by (i) the thin-film metal magnetic layer and the thin-film metal magnetic layer, (ii) the thin-film metal magnetic layer and the granular structured magnetic layer, (iii) the granular structured magnetic layer and the thin-film metal magnetic layer, and (iv) the granular structured magnetic layer and the granular structured magnetic layer. If the combination (iv), that is, if the granular structured magnetic layer is used for both the first and second magnetic layers 74 and 76, the medium noise and the required recording magnetic field intensity can further be reduced, thereby making it possible to realize a magnetic recording medium that enables easy recording of information.

Figure 19:
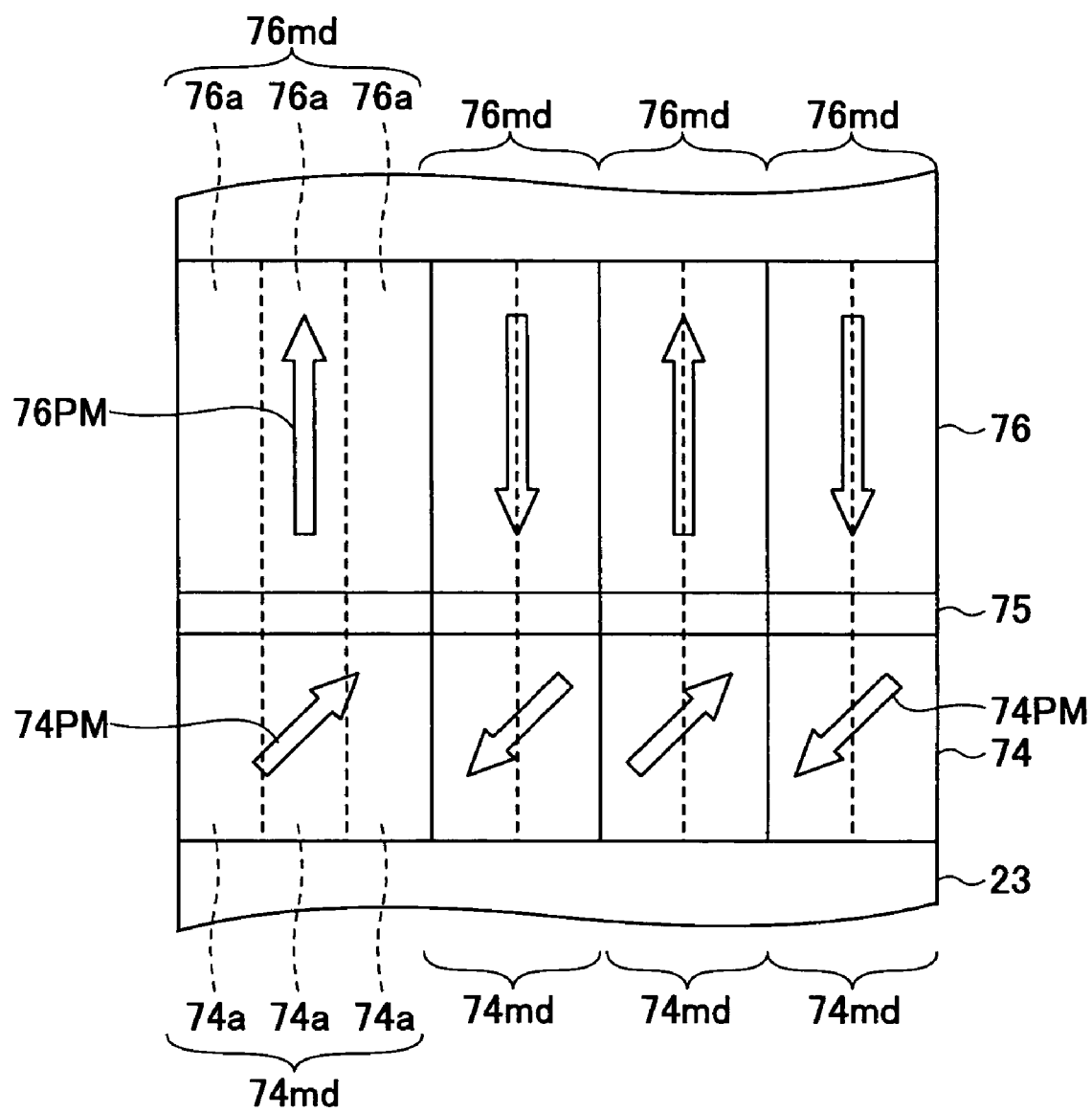
FIG. 19 is a diagram schematically showing the state of the recording layer of the sixth embodiment of the magnetic recording medium after the recording.

FIG. 19 is a diagram schematically showing the state of the recording layer of the sixth embodiment of the magnetic recording medium after the recording. FIG. 19 shows a cross section taken along the recording direction of the magnetic recording medium 70.

Referring to FIGS. 19 and 18, when a recording operation is carried out, a recording magnetic field which alternatively reverses direction along the direction perpendicular to the substrate surface is applied to the first and second magnetic layers 74 and 76 by a recording head (not shown), to thereby form a plurality of magnetization regions 74md in the first magnetic layer 74 and a plurality of magnetization regions 76md in the second magnetic layer 76. Each magnetization region 74md is made up of a plurality of crystal grains 74a, and each magnetization region 76md is made up of a plurality of crystal grains 76a. As shown in FIG. 18, the c-axes 74CA of the crystal grains 74a are oriented in an inclined direction with respect to the substrate surface, and thus, a remanent magnetization 74PM is formed in the magnetization region 74md of the first magnetic layer 74, in an inclined direction indicated by an arrow, which is inclined with respect to the substrate surface, along the c-axes 74CA. On the other hand, the c-axes 76CA of the crystal grains 76a are oriented in the perpendicular direction with respect to the substrate surface, and thus, a remanent magnetization 76PM is formed in the magnetization region 76md of the second magnetic layer 76, in the perpendicular direction indicated by an arrow, which is perpendicular with respect to the substrate surface, along the c-axes 76CA. The directions of the remanent magnetizations 74PM and 76PM may be deviated from the orientation directions of the respective c-axes 74CA and 76CA due to the mutual ferromagnetic interaction.

Since the first magnetic layer 74 and the second magnetic layer 76 are ferromagnetically coupled via the intermediate layer 75, a component of the remanent magnetization 74PM, perpendicular to the substrate surface, becomes the same as the direction of the remanent magnetization 76PM. It may be regarded that the ferromagnetic coupling force is mainly due to the magnetostatic interaction, but an exchange interaction may also be present.

As described above, the recording magnetic field is applied in the perpendicular direction with respect to the substrate surface when carrying out the recording operation. Hence, the direction of the recording magnetic field is inclined with respect to the remanent magnetization 74PM of the first magnetic layer 74. For example, if the direction of the remanent magnetization 74PM is 28 degrees with respect to the substrate surface, the angle formed between the direction of the recording magnetic field and the direction of the remanent magnetization 74PM is 62 degrees. Since the recording magnetic field is applied in such an inclined direction with respect to the remanent magnetization 74PM, the remanent magnetization 74PM can be reversed by the recording magnetic field intensity that is considerably smaller than the anisotropic magnetic field of the first magnetic layer 74, as may be readily understood from the description given above in conjunction with FIG. 3B. By reversing the remanent magnetization 74PM, the ferromagnetic interaction caused by the remanent magnetization 74PM acts on the remanent magnetization 76PM of the second magnetic layer 76. This ferromagnetic interaction acts in a direction such that the magnetic field generated by the remanent magnetization 74PM reverses the remanent magnetization 76PM, for example, the remanent magnetization 76PM is reversed by this magnetic field and the recording magnetic field. As a result, the recording performance of the magnetic recording medium 70, such as the overwrite performance and the non-linear transition shift (NLTS), is improved. In addition, because the recording magnetic field intensity generated by the recording head can be reduced, the ferromagnetic material used for the recording head can be selected with a larger degree of freedom, and the production of the recording head is facilitated.

Furthermore, since the first magnetic layer 74 is located at a position that is farther from the recording head than the second magnetic layer 76, the recording magnetic field that is applied to the first magnetic layer 74 tends to be lower in intensity than the recording magnetic field that is applied to the second magnetic layer 76. However, because the remanent magnetization 74PM formed in the first magnetic layer 74 can be reversed by the recording magnetic field intensity that is considerably smaller than the anisotropic magnetic field of the first magnetic layer 74, it is easier to improve the recording performance of the magnetic recording medium 70 even when compared with a seventh embodiment of the magnetic recording medium according to the present invention which will be described later.

The saturation magnetic flux densities of the second soft magnetic layer 52A and the third soft magnetic layer 52B which form the anti-ferromagnetic exchange-coupled structure via the non-magnetic coupling layer 53 are preferably set in a range of 10 kG to 24 kG. By setting the saturation magnetic flux densities to such a range, it is possible to suppress the spreading of the recording magnetic field and suppress the recording magnetic field from being applied to the magnetization region that is adjacent to the region to which the recording is to be made, and thereby suppress the so-called off-track erase from occurring. Moreover, as described above in conjunction with the fourth embodiment, the anti-ferromagnetic exchange-coupled structure is preferable from the point of view of suppressing the noise or spike noise caused by magnetic domain wall motion. If the noise can be suppressed sufficiently by the sole use of the first soft magnetic layer 51, it is of course possible to omit the second soft magnetic layer 52A, the non-magnetic coupling layer 53 and the third soft magnetic layer 52B.

Furthermore, although the first soft magnetic layer 51 has the function of substantially drawing in and ejecting out the recording magnetic field, it is of course possible instead to realize this function by the second soft magnetic layer 52A, the non-magnetic coupling layer 53 and the third soft magnetic layer 52B. In addition, the first soft magnetic layer 51 may be omitted depending on the structure of the recording head.

Therefore, according to the magnetic recording medium 70 of this sixth embodiment, the c-axes 74CA of the first magnetic layer 74 are inclined with respect to the substrate surface and the c-axes 76CA of the second magnetic layer 76 are approximately perpendicular with respect to the substrate surface. For this reason, the remanent magnetization 74PM can be reversed by the recording magnetic field intensity that is considerably smaller than the anisotropic magnetic field of the first magnetic layer 74. As a result, the recording performance of the magnetic recording medium 70, such as the overwrite performance and the NLTS, are improved, and the S/N ratio of the magnetic recording medium 70 is improved. Moreover, since the information is recordable on the magnetic recording medium 70 even if the anisotropic magnetic field of the first magnetic layer 74 is increased, it is possible to simultaneously realize facilitated information recording and improved thermal stability of the recorded magnetizations.

Seventh Embodiment

The seventh embodiment of the magnetic recording medium according to the present invention is basically a modification of the sixth embodiment of the magnetic recording medium described above.

Figure 20:
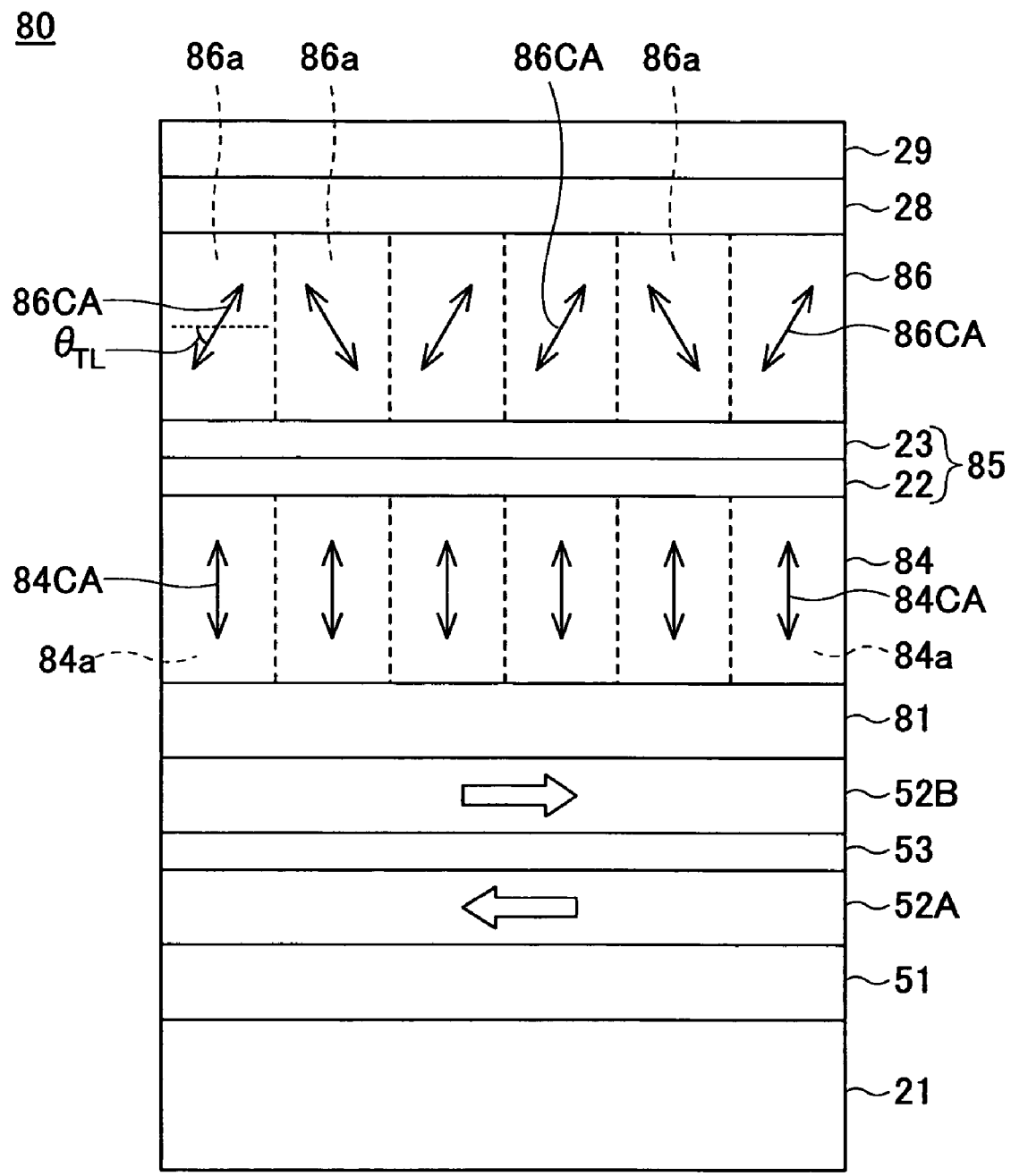
FIG. 20 is a cross sectional view showing a seventh embodiment of the magnetic recording medium according to the present invention.

FIG. 20 is a cross sectional view showing this seventh embodiment of the magnetic recording medium according to the present invention. In FIG. 20, those parts that are the same as those corresponding parts of the embodiments described above are designated by the same reference numerals, and a description thereof will be omitted.

A magnetic recording medium 80 of this embodiment includes a substrate 21, and a first soft magnetic layer 51, a second soft magnetic layer 52A, a non-magnetic coupling layer 53, a third soft magnetic layer 52B, an underlayer 81, a first magnetic layer 84, an intermediate stacked structure 85 made up of an orientation control layer 22 and an underlayer 23, a second magnetic layer 86, a protection layer 28, and a lubricant layer 29 that are successively formed on the substrate 21 as shown in FIG. 20.

The structure of the magnetic recording medium 80 is basically the same as that of the magnetic recording medium 70 of the sixth embodiment shown in FIG. 18, except that in the magnetic recording medium 80 shown in FIG. 20, axes of easy magnetization or c-axes 86CA of crystal grains 86a of the second magnetic layer 86 are inclined with respect to the substrate surface, and axes of easy magnetization or c-axes 84CA of crystal grains 84a of the first magnetic layer 84 are approximately perpendicular with respect to the substrate surface.

The underlayer 81 may be made of a material selected from any suitable transition metals or alloys thereof that orient c-axes 84CA of crystal grains 84a of the first magnetic layer 84 perpendicular with respect to the substrate surface. For example, the underlayer 81 is made of a material including at least one kind of element selected from a group consisting of Mo, Nb, V, W, Cr, Al, Cu, Pt, Ru and Re. The underlayer 81 may be formed by a single-layer structure that is made up of a single layer or, formed by a multi-layer structure that is made up of two or more layers.

In a case where the first magnetic layer 84 has the so-called granular structure made up of a ferromagnetic material having Co as the main component and having the hcp crystal structure and a non-magnetic material, the underlayer 81 is preferably made of Ru or, a Ru—X2 alloy having an hcp crystal structure and having Ru as the main component, where X2 is at least one kind of element selected from a group consisting of Co, Cr, Fe, Ni and Mn. In this case, the crystal grains 84a of the first magnetic layer 84 grow epitaxially on the underlayer 81 in a uniform manner along the in-plane direction. Hence, the crystal grains 84a of the first magnetic layer 84 are sufficiently isolated by the non-solid phase (not shown) of the non-magnetic material, to thereby reduce the medium noise and to improve the S/N ratio. In this case, the underlayer 81 preferably has a thickness in a range of 5 nm to 35 nm. If the thickness of the underlayer 81 becomes less than 5 nm, the underlayer crystallinity deteriorates, to thereby deteriorate the crystallinity of the crystal grains 84a of the first magnetic layer 84. On the other hand, if the thickness of the underlayer 81 exceeds 35 nm, the grain diameter of the crystal grains 84a of the first magnetic layer 84 becomes large, to thereby increase the medium noise.

When forming the underlayer 81 by sputtering, it is preferable to use a sputtering target that is made of Ru or, a Ru—X2 alloy having an hcp crystal structure and having Ru as the main component, and to set an inert gas (for example, Ar gas) atmosphere within the chamber of the sputtering apparatus to a pressure of 6.0 Pa or higher. Under such sputtering conditions, the crystal grains of the underlayer 81 become mutually isolated at the grain boundaries. In other words, gaps are formed at a portion or all of the grain boundaries, to thereby mutually isolate the crystal grains of the underlayer 81 in a satisfactory manner. It may be regarded that the inert gas exists in the gaps or, the gaps are in a vacuum state. Essentially one crystal grain of the first magnetic layer 84 is grown on each of the crystal grains of the underlayer 81, and for this reason, the crystal grains of the first magnetic layer 84 can be formed even more uniformly along the in-plane direction. Consequently, the medium noise is further reduced, and the S/N ratio is further improved.

The intermediate stacked structure 85 is formed by successively stacking the orientation control layer 22 and the underlayer 23 on the first magnetic layer 84. The orientation control layer 22 and the underlayer 23 may be made of materials similar to those used for the orientation control layer 22 and the underlayer 23 of the first embodiment shown in FIG. 4. In addition, the thickness of the intermediate stacked structure 85 is set so that the magnetizations of the first and second magnetic layers 84 and 86 become ferromagnetically coupled. More particularly, the intermediate stacked structure 85 preferably has a thickness of 5 nm or less, and even more preferably has a thickness of 2 nm or less.

The first and second magnetic layers 84 and 86 may be made of materials similar to those used for the first and second magnetic layers 74 and 76 of the sixth embodiment shown in FIG. 18. However, the c-axes 84CA of the crystal grains 84a of the first magnetic layer 84 are oriented approximately perpendicularly with respect to the substrate surface due to the effects of the underlayer 81. On the other hand, the c-axes 86CA of the crystal grains 86a of the second magnetic layer 86 are inclined with respect to the substrate surface by the effects of the intermediate stacked structure 85. The orientation direction of the c-axes 86CA of the second magnetic layer 86 is the same as that of the c-axes 74CA of the first magnetic layer 74 of the sixth embodiment shown in FIG. 18.

From the point of view of obtaining a satisfactory recording performance, the second magnetic layer 86 is preferably thinner than the first magnetic layer 84.

Figure 21:
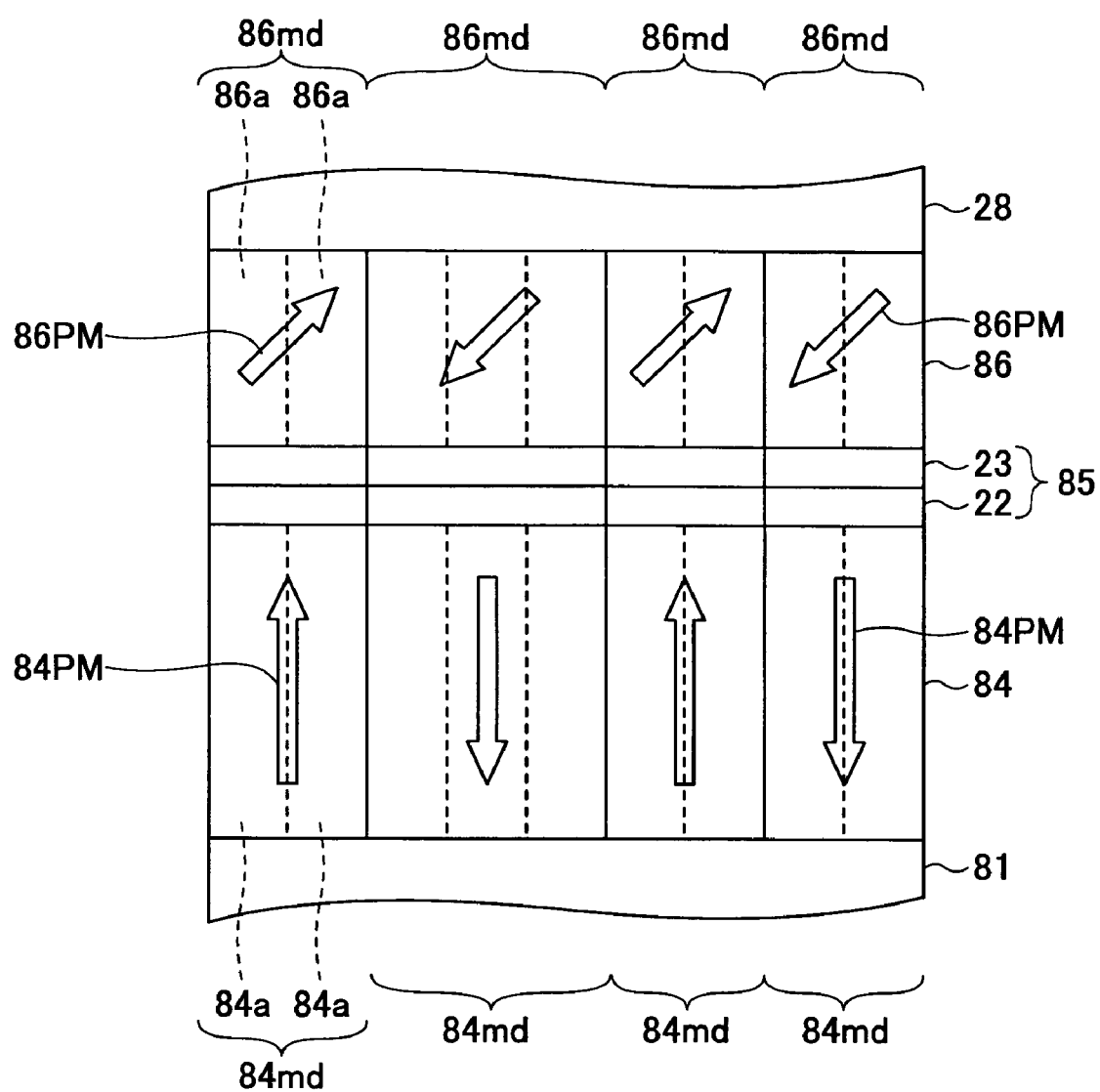
FIG. 21 diagram schematically showing the state of the recording layer of the seventh embodiment of the magnetic recording medium after the recording.

FIG. 21 diagram schematically showing the state of the recording layer of the seventh embodiment of the magnetic recording medium after the recording. FIG. 21 shows a cross section taken along the recording direction of the magnetic recording medium 80.

Referring to FIGS. 21 and 20, when a recording operation is carried out, a recording magnetic field which alternatively reverses direction along the direction perpendicular to the substrate surface is applied to the first and second magnetic layers 84 and 86 by a recording head (not shown), to thereby form a plurality of magnetization regions 84md in the first magnetic layer 84 and a plurality of magnetization regions 86md in the second magnetic layer 86. Each magnetization region 84md is made up of a plurality of crystal grains 84a, and each magnetization region 86md is made up of a plurality of crystal grains 86a. As shown in FIG. 20, the c-axes 86CA of the crystal grains 86a are oriented in an inclined direction with respect to the substrate surface, and thus, a remanent magnetization 86PM is formed in the magnetization region 86md of the second magnetic layer 86, in an inclined direction indicated by an arrow, which is inclined with respect to the substrate surface, along the c-axes 86CA. On the other hand, the c-axes 84CA of the crystal grains 84*a* are oriented in the perpendicular direction with respect to the substrate surface, and thus, a remanent magnetization 84PM is formed in the magnetization region 84*md* of the first magnetic layer 84, in the perpendicular direction indicated by an arrow, which is perpendicular with respect to the substrate surface, along the c-axes 84CA. The directions of the remanent magnetizations 84PM and 86PM may be deviated from the orientation directions of the respective c-axes 84CA and 86CA due to the mutual ferromagnetic interaction.

Since the first magnetic layer 84 and the second magnetic layer 86 are ferromagnetically coupled via the intermediate stacked structure 85, a component of the remanent magnetization 86PM, perpendicular to the substrate surface, becomes the same as the direction of the remanent magnetization 84PM. It may be regarded that the ferromagnetic coupling force is mainly due to the magnetostatic interaction, but an exchange interaction may also be present.

As described above, the recording magnetic field is applied in the perpendicular direction with respect to the substrate surface when carrying out the recording operation. Hence, the direction of the recording magnetic field is inclined with respect to the remanent magnetization 86PM of the second magnetic layer 86. For example, if the direction of the remanent magnetization 86PM is 28 degrees with respect to the substrate surface, the angle formed between the direction of the recording magnetic field and the direction of the remanent magnetization 86PM is 62 degrees. Since the recording magnetic field is applied in such an inclined direction with respect to the remanent magnetization 86PM, the remanent magnetization 86PM can be reversed by the recording magnetic field intensity that is considerably smaller than the anisotropic magnetic field of the second magnetic layer 86, as may be readily understood from the description given above in conjunction with FIG. 3B. By reversing the remanent magnetization 86PM, the ferromagnetic interaction caused by the remanent magnetization 86PM acts on the remanent magnetization 84PM of the first magnetic layer 84. This ferromagnetic interaction acts in a direction such that the magnetic field generated by the remanent magnetization 86PM reverses the remanent magnetization 84PM, for example, the remanent magnetization 84PM is reversed by this magnetic field and the recording magnetic field. As a result, the recording performance of the magnetic recording medium 80, such as the overwrite performance and the NLTS, is improved. In addition, because the recording magnetic field intensity generated by the recording head can be reduced, the ferromagnetic material used for the recording head can be selected with a larger degree of freedom, and the production of the recording head is facilitated.

As described above, according to the magnetic recording medium 80 of this seventh embodiment, the c-axes 84CA of the crystal grains 84*a* of the first magnetic layer 84 are oriented in the direction approximately perpendicular to the substrate surface, and the c-axes 86CA of the crystal grains 86*a* of the second magnetic layer 86 are oriented in the direction inclined with respect to the substrate surface. Hence, the remanent magnetization 86PM formed in the second magnetic layer 86 can be reversed by the recording magnetic field intensity that is considerably smaller than the anisotropic magnetic field of the second magnetic layer 86, thereby making it possible to reduce the recording magnetic field intensity that is required for the recording and to obtain a satisfactory recording performance.

Furthermore, since the information is recordable on the magnetic recording medium 80 of this seventh embodiment even if the anisotropic magnetic field of the second magnetic layer 86 is increased, it is possible to simultaneously realize facilitated information recording and improved thermal stability of the recorded magnetizations.

[Embodiment of Magnetic Storage Apparatus]

Figure 22:
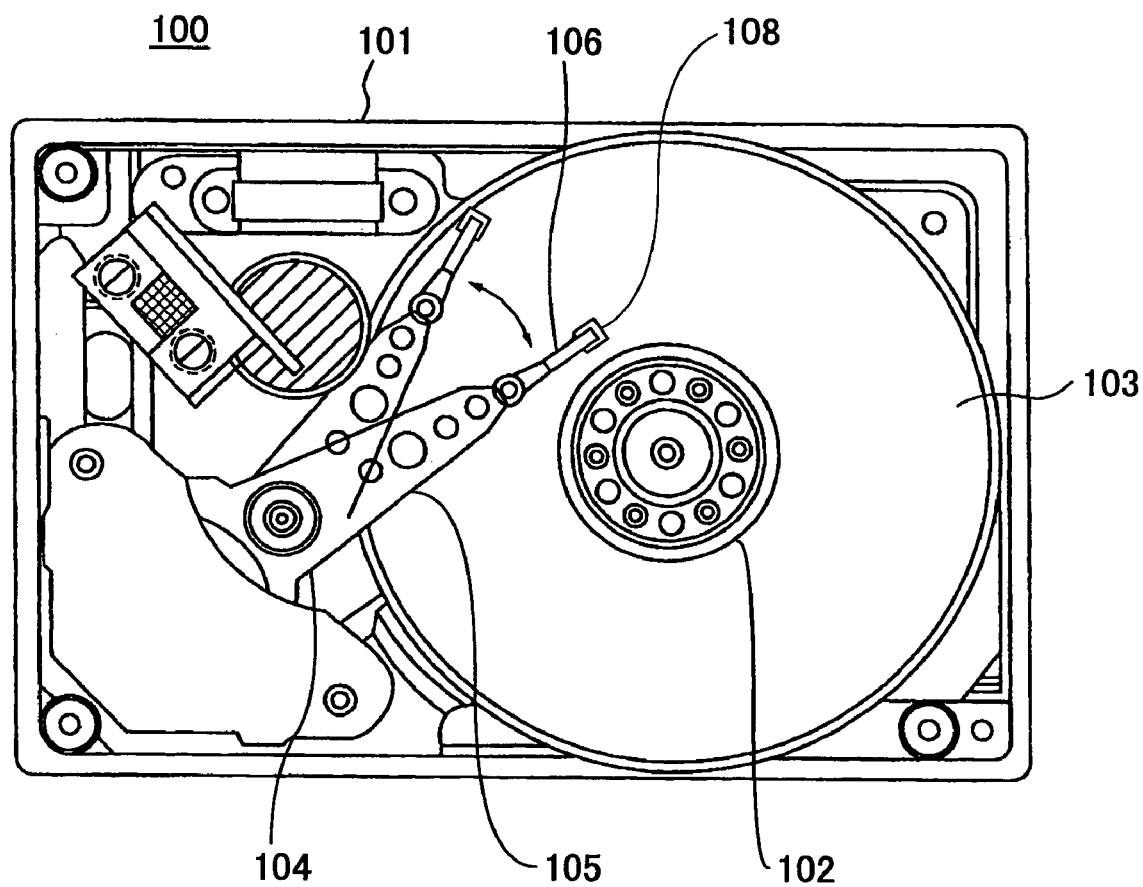
FIG. 22 is a diagram showing an important part of an embodiment of a magnetic storage apparatus according to the present invention.

Next, a description will be given of an embodiment of a magnetic storage apparatus according to the present invention. FIG. 22 is a diagram showing an important part of this embodiment of the magnetic storage apparatus according to the present invention.

As shown in FIG. 22, a magnetic storage apparatus 100 generally includes a housing 101. A hub 102 that is driven by a spindle (not shown), one or a plurality of magnetic recording media 103 fixed on and rotated by the hub 102, an actuator unit 104, one or a plurality of arms 105 provided on the actuator unit 104 correspondingly to the one or plurality of magnetic recording media 103 and movable in a radial direction of the magnetic recording medium 103, and one or a plurality of magnetic heads 108 that are supported on corresponding arms 105 via suspensions 106.

The magnetic head 108 includes a reproducing head such as a magnetoresistive (MR) element, a giant magnetoresistive (GMR) element and a tunneling magnetoresistive (TMR) element. In addition, the magnetic head 108 also includes a ring type inductive thin film recording head employing the in-plane magnetic recording technique or, a single magnetic pole recording head employing the perpendicular magnetic recording technique. The single magnetic pole recording head may include a trailing shield. The basic structure of the magnetic storage apparatus 100 itself is known, and a detailed description thereof will be omitted in this specification.

Each magnetic recording medium 103 may have the structure of any one of the first through seventh embodiments of the magnetic recording medium described above. In the case where the ring type inductive thin film recording head employing the in-plane magnetic recording technique is used, each magnetic recording medium 103 may have the structure of any one of the first through third embodiments of the magnetic recording medium. In the case where the single magnetic pole recording head employing the perpendicular magnetic recording technique is used, each magnetic recording medium 103 may have the structure of any one of the fourth through seventh embodiments of the magnetic recording medium. As described above, the magnetic recording medium 103 has improved thermal stability and S/N ratio. Hence, according to this embodiment of the magnetic storage apparatus, it is possible to secure a satisfactory recording performance, improve the thermal stability of recorded magnetization of the recording layer, improve the S/N ratio, and further improve the high recording density.

The basic structure of the magnetic storage apparatus 100 is of course not limited to that shown in FIG. 22, and any basic structure suitable for use with the magnetic recording medium 103 may be employed.

In the first and third through seventh embodiments of the magnetic recording medium described above, the substrate has a flat surface. However, convex-shaped cells may be regularly formed on the substrate surface, so as to form the so-called patterned medium. Since the cells are isolated from each other, it is possible to suppress the mutual exchange effect of the recording layer and the magnetic mutual effect among the cells, to enable further reduction in noise. In addition, although the magnetic recording medium used by the embodiment of the magnetic storage apparatus is described as a magnetic disk, the present invention is not limited to the magnetic disk, and may similarly be applied to a magnetic tape, for example.

This application claims the benefit of Japanese Patent Applications No. 2005-029558 filed Feb. 4, 2005 and No. 2005-340407 filed Nov. 25, 2005, in the Japanese Patent Office, the disclosures of which are hereby incorporated by reference.

Further, the present invention is not limited to these embodiments, but various variations and modifications may be made without departing from the scope of the present invention.

What is claimed is:

1. A magnetic recording medium comprising:
a substrate having a surface;
an orientation control layer disposed above the surface of the substrate;
an underlayer disposed above the orientation control layer; and
a recording layer having an hcp crystal structure and disposed on a surface of the underlayer,
said recording layer being epitaxially grown on the surface of the underlayer to define a plurality of crystal grains, wherein the crystal grains have c-axes that are inclined in a plurality of random directions, but wherein each random direction defines an angle with respect to the surface of the substrate that is within a range that is greater than 0 degrees and less than or equal to 30 degrees.

2. The magnetic recording medium as claimed in claim 1, wherein the orientation control layer is made of a non-magnetic material including nitrogen or oxygen.

3. A magnetic recording medium comprising:
a substrate having a surface;
an orientation control layer disposed above the surface of the substrate;
an underlayer, made of Cr or a Cr alloy having Cr as a main component, and disposed above the orientation control layer; and
a recording layer having an hcp crystal structure and disposed on a surface of the underlayer,
said orientation control layer being made of a non-magnetic material including nitrogen or oxygen,
said recording layer being made up of a first magnetic layer, a non-magnetic coupling layer and a second magnetic layer that are successively epitaxially grown on the surface of the underlayer,
said first and second magnetic layers being exchange-coupled and having magnetizations that are mutually antiparallel in a state where no external magnetic field is applied to the magnetic recording medium,
said first and second magnetic layers being made of a ferromagnetic material having an hcp crystal structure and including Co as a main component, defining a plurality of crystal grains, wherein the crystal grains have c-axes that are inclined in a plurality of random directions, but wherein each random direction defines an angle with respect to the surface of the substrate that is within a range that is greater than 0 degrees and less than or equal to 30 degrees.

4. The magnetic recording medium as claimed in claim 3, wherein the non-magnetic coupling layer is made of a material selected from a group consisting of Ru, Rh, Ir, Ru alloys, Rh alloys and Ir alloys.

5. The magnetic recording medium as claimed in claim 3, wherein the surface of the substrate includes a plurality of concave portions and/or a plurality of convex portions that respectively extend in a recording direction.

6. The magnetic recording medium as claimed in claim 3, wherein the substrate has a disk shape, and the surface of the substrate includes a plurality of concave portions and/or a plurality of convex portions that respectively extend in a circumferential direction.

7. The magnetic recording medium as claimed in claim 5, further comprising:
a seed layer, made of an amorphous material or a crystalline material having a B2 crystal structure, disposed on the surface of the substrate,
said seed layer having a surface that includes a plurality of concave portions and/or a plurality of convex portions that respectively extend in a recording direction.

8. The magnetic recording medium as claimed in claim 3, wherein the non-magnetic material including nitrogen or oxygen is selected from a group consisting of NiP, AlV, AlTi, CoW and CrTi.

9. The magnetic recording medium as claimed in claim 3, wherein the non-magnetic material including nitrogen or oxygen is selected from a group consisting of crystalline metals having a bcc crystal structure and a B2 crystal structure.

10. The magnetic recording medium as claimed in claim 3, wherein the non-magnetic material including nitrogen or oxygen has an fcc crystal structure and is selected from a group consisting of Au, Al, Ag, Pt and alloys thereof.

11. The magnetic recording medium as claimed in claim 3, wherein the underlayer is made of Cr—X1 having a bcc crystal structure, where X1 is selected from a group consisting of W, Mo, Nb, Ta, V and alloys thereof.

12. The magnetic recording medium as claimed in claim 3, wherein the first and second magnetic layers are made of a ferromagnetic material selected from a group consisting of CoCr, CoCr alloys, CoPt, CoCrPt, CoCrTa and CoCrPt alloys.

13. The magnetic recording medium as claimed in claim 3, wherein a diffraction ray observed with respect to Co by a θ-2θ scan by an X-ray diffractometer method only corresponds substantially to a (10-11) crystal.

14. The magnetic recording medium as claimed in claim 3, wherein a diffraction ray observed with respect to Cr by a θ-2θ scan by an X-ray diffractometer method only corresponds substantially to a (110) crystal face.

15. The magnetic recording medium as claimed in claim 3, a coercivity ratio Hc1/Hc2 of an in-plane coercivity Hc1 to a perpendicular coercivity Hc2 of the recording layer, measured by a Kerr rotation angle measuring method, is in a range of 0.34 or greater and 0.41 or less.

16. The magnetic recording medium as claimed in claim 3, further comprising:
a first soft magnetic layer disposed between the substrate and the orientation control layer.

17. The magnetic recording medium as claimed in claim 16, further comprising:
a stacked structure, disposed between the substrate and the orientation control layer, and comprising a second soft magnetic layer, a second non-magnetic coupling layer and a third soft magnetic layer that are successively stacked,
said second and third soft magnetic layers being exchange-coupled, and having magnetizations that are mutually antiparallel in a state where no external magnetic field is applied to the magnetic recording medium.

18. The magnetic recording medium as claimed in claim 17, wherein the stacked structure is stacked on the first soft magnetic layer, and the second and third soft magnetic layers have saturation magnetic flux densities that are larger than that of the first soft magnetic layer.

19. The magnetic recording medium as claimed in claim 17, wherein said second non-magnetic coupling layer is made of a material selected from a group consisting of Ru, Re, Os, Ir and alloys thereof.

20. A magnetic storage apparatus comprising:
   at least one magnetic recording medium including:
      a substrate having a surface;
      an orientation control layer disposed above the surface of the substrate;
      an underlayer disposed above the orientation control layer; and
      a recording layer having an hcp crystal structure and disposed on a surface of the underlayer, said recording layer being epitaxially grown on the surface of the underlayer to define a plurality of crystal grains, wherein the crystal grains have c-axes that are inclined in a plurality of random directions, but wherein each random direction defines an angle with respect to the surface of the substrate that is within a range that is greater than 0 degrees and less than or equal to 30 degrees; and
   at least one head part configured to record information on and reproduce information from the magnetic recording medium.

* * * * *